United States Patent
Cao

(10) Patent No.: US 12,356,387 B2
(45) Date of Patent: Jul. 8, 2025

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 457 days.

(21) Appl. No.: 17/792,143

(22) PCT Filed: Feb. 18, 2021

(86) PCT No.: PCT/CN2021/076688
§ 371 (c)(1),
(2) Date: Jul. 12, 2022

(87) PCT Pub. No.: WO2021/169828
PCT Pub. Date: Sep. 2, 2021

(65) Prior Publication Data
US 2023/0096215 A1    Mar. 30, 2023

(30) Foreign Application Priority Data
Feb. 25, 2020 (CN) .......................... 202010116448.5

(51) Int. Cl.
*H04W 72/044* (2023.01)
*H04W 36/00* (2009.01)
(Continued)

(52) U.S. Cl.
CPC ....... *H04W 72/046* (2013.01); *H04W 72/231* (2023.01); *H04W 72/232* (2023.01); *H04W 36/0064* (2023.05)

(58) Field of Classification Search
CPC ............. H04W 72/046; H04W 72/231; H04W 72/232; H04W 36/0064; H04W 36/085;
(Continued)

(56) References Cited

U.S. PATENT DOCUMENTS

| 2019/0387440 A1 | 12/2019 | Yiu et al. |
| 2021/0083813 A1 | 3/2021 | Wu |

(Continued)

FOREIGN PATENT DOCUMENTS

| CN | 109802757 A | 5/2019 |
| CN | 110720233 A | 1/2020 |
| WO | WO-2020020005 A1 | 1/2020 |

OTHER PUBLICATIONS

Sony: "Further enhancement on multi-beam operation", 3GPP Draft; R1-2100844, 3rd Generation Partnership Project (3GPP), Mobile Competence Centre ; 650, Route Des Lucioles ; F-06921 Sophia-Antipolis Cedex; France, vol. RAN WG1, No. E-meeting; Jan. 25, 2021-Feb. 5, 2021 Jan. 19, 2021 (Jan. 19, 2021), XP051971196.

(Continued)

*Primary Examiner* — Charles C Jiang
*Assistant Examiner* — Rachel Elizabeth Marks
(74) *Attorney, Agent, or Firm* — XSENSUS LLP

(57) ABSTRACT

Provided are an electronic device and a method for wireless communication, and a computer-readable storage medium. The electronic device comprises: a processing circuit, configured to: send, by means of radio resource control signaling, configuration information of a universal transmission configuration indication state to a user equipment, wherein the universal transmission configuration indication state comprises a transmission configuration indication state of a downlink beam of a serving cell of the user equipment and a transmission configuration indication state of a downlink beam of a non-serving cell other than the serving cell; and (Continued)

determine activation information of a downlink beam of a target cell, wherein the user equipment is to be switched to the target cell.

4 Claims, 19 Drawing Sheets

(51) Int. Cl.
*H04W 72/231* (2023.01)
*H04W 72/232* (2023.01)

(58) Field of Classification Search
CPC ......... H04W 36/0061; H04W 36/0016; H04W 72/21; H04W 72/23; H04B 7/0695; H04B 7/088; H04L 5/001; H04L 5/0023; H04L 5/0053; H04L 5/0091; H04L 5/0048
See application file for complete search history.

(56) References Cited

U.S. PATENT DOCUMENTS

| | | | | |
|---|---|---|---|---|
| 2021/0243734 | A1* | 8/2021 | Zhang | H04L 5/0032 |
| 2022/0158715 | A1* | 5/2022 | Bishwarup | H04W 76/19 |
| 2023/0007499 | A1* | 1/2023 | Da Silva | H04W 24/02 |
| 2023/0078059 | A1* | 3/2023 | Zhang | H04W 36/0094 370/331 |
| 2023/0092905 | A1* | 3/2023 | Zhang | H04L 5/0094 370/331 |

OTHER PUBLICATIONS

International Search Report and Written Opinion mailed on May 19, 2021, received for PCT Application PCT/CN2021/076688, filed on Feb. 18, 2021, 12 pages including English Translation.

Ericsson, "Lower-layer mobility enhancements", 3GPP TSG-RAN WG1 Meeting #98bis, Tdoc R1-1911226, Oct. 14-20, 2019, pp. 1-10.

Futurewei, "Enhancement on multi-beam operation", 3GPP TSG RAN WG1 Meeting #104-e, R1-2100044, Jan. 25-Feb. 5, 2021, 13 pages.

Huawei et al., "Enhancements on multi-TRP/panel transmission" 3GPP TSG RAN WG1 Meeting #98bis, R1-1910073, Oct. 14-20, 2019, 29 pages.

Nokia et al., "Enhancements on Multi-TRP/Panel Transmission" 3GPP TSG RAN WG1 #98bis Meeting, R1-1910915, Oct. 14-20, 2019, 21 pages.

* cited by examiner

*TCI-State information element*

```
-- ASN1START
-- TAG-TCI-STATES-START

TCI-State ::=                  SEQUENCE {
    tci-StateId                    TCI-StateId,
    qcl-Type1                      QCL-Info,
    qcl-Type2                      QCL-Info                OPTIONAL,    -- Need R
    ...
}

QCL-Info ::=                   SEQUENCE {
    cell                           ServCellIndex           OPTIONAL,    -- Need R
    bwp-Id                         BWP-Id                  OPTIONAL,    -- Cond CSI-RS-Indicated
    referenceSignal                CHOICE {
        csi-rs                         NZP-CSI-RS-ResourceId,
        ssb                            SSB-Index
    },
    qcl-Type                       ENUMERATED {typeA, typeB, typeC, typeD},
    ...
}

-- TAG-TCI-STATES-STOP
-- ASN1STOP
```

Figure 2

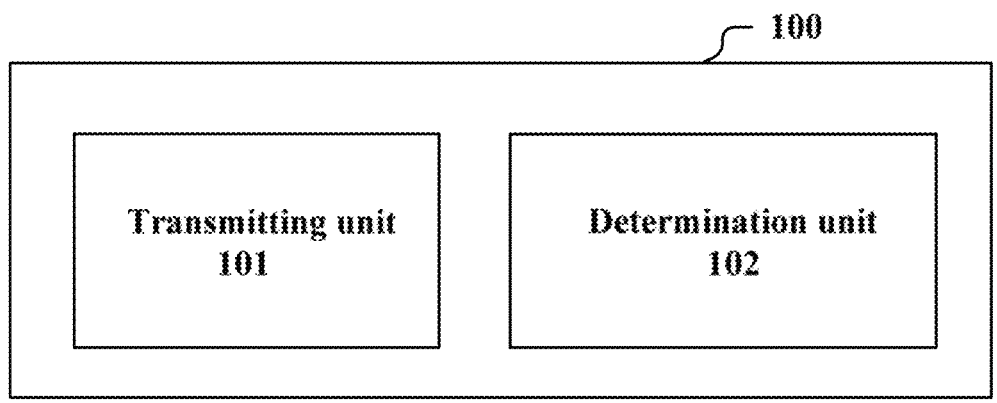

Figure 3

*TCI-State information element*

```
-- ASN1START
-- TAG-TCI-STATE-START

TCI-State ::=                   SEQUENCE {
    tci-StateId                 TCI-StateId,
    qcl-Type1                   QCL-Info,
    qcl-Type2                   QCL-Info                    OPTIONAL,   -- Need R
    ...
}

QCL-Info ::=                    SEQUENCE {
    cell                        CHOICE {
                                ServCellIndex
                                PCI-Index       --Cond PCI configured for mobility
    },                                                      OPTIONAL,   -- Need R
    bwp-Id                      BWP-Id                      OPTIONAL,   -- Cond CSI-RS-Indicated
    referenceSignal             CHOICE {
        csi-rs                  NZP-CSI-RS-ResourceId,
        ssb                     SSB-Index
    },       --Cond NZP-CSI-RS-ResourceId or SSB-Index configured for mobility measurement
    qcl-Type                    ENUMERATED {typeA, typeB, typeC, typeD},
    ...
}

-- TAG-TCI-STATE-STOP
-- ASN1STOP
```

Figure 4

*UL TCI-State* information element

```
-- ASN1START
-- TAG-TCI-STATE-START

TCI-State ::=              SEQUENCE {
    ul-TCI-StateId             UL-TCI-StateId,
    qcl-Type1                  QCL-Info,
    qcl-Type2                  QCL-Info                    OPTIONAL,   -- Need R
    ...
}

QCL-Info ::=               SEQUENCE {
    cell                       CHOICE {
                                   ServCellIndex
                                   PCI-Index
                                                           OPTIONAL,   -- Need R
    },
    bwp-Id                     BWP-Id                      OPTIONAL,   -- Cond CSI-RS-Indicated
    referenceSignal            CHOICE {
        csi-rs                     NZP-CSI-RS-ResourceId,
        ssb                        SSB-Index,
        srs                        SRS-ResourceId          --Cond PCI not selected
    },
    qcl-Type                   ENUMERATED {typeA, typeB, typeC, typeD},
    ...
}

-- TAG-TCI-STATE-STOP
-- ASN1STOP
```

Figure 16

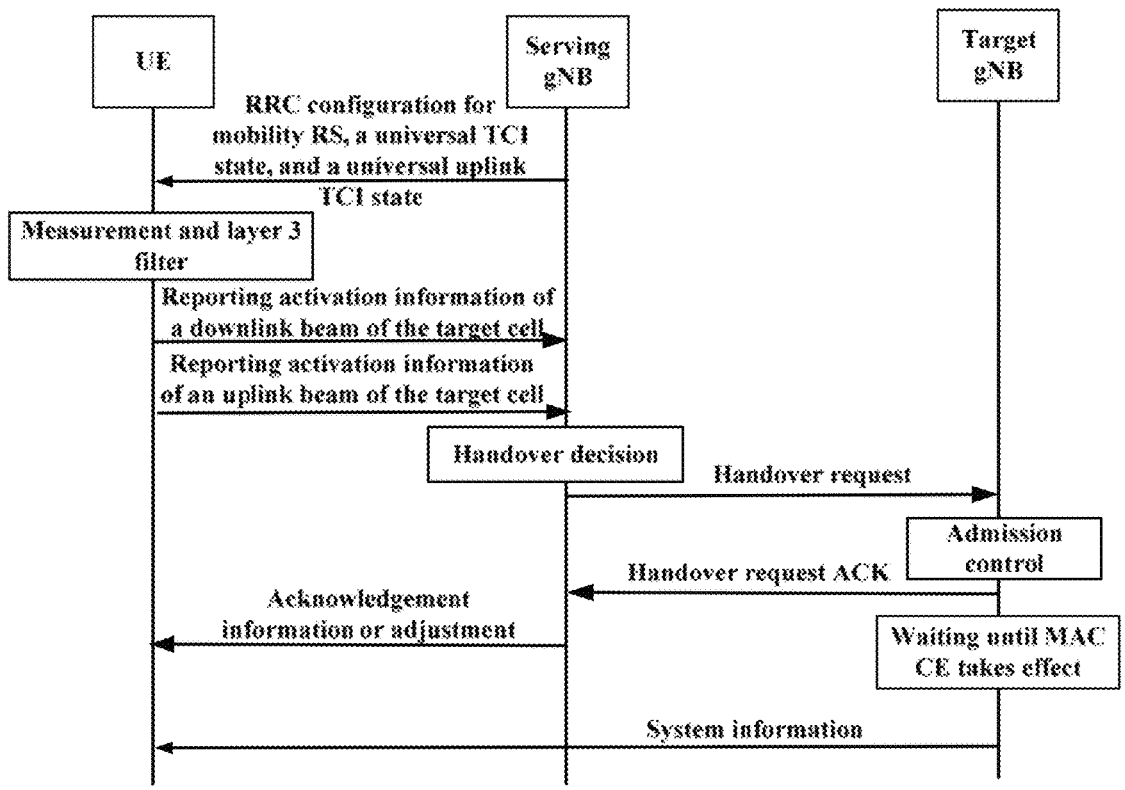

Figure 20

*PUCCH-SpatialRelationInfo* information element

```
-- ASN1START
-- TAG-PUCCH-SPATIALRELATIONINFO-START

PUCCH-SpatialRelationInfo ::=         SEQUENCE {
    pucch-SpatialRelationInfoId       PUCCH-SpatialRelationInfoId,
    servingCellId                     ServCellIndex                    OPTIONAL,  -- Need S
    cell                              CHOICE {
                                          ServCellIndex
                                          PCI-Index
                                      },
    referenceSignal                   CHOICE {
        ssb-Index                         SSB-Index,
        csi-RS-Index                      NZP-CSI-RS-ResourceId,
        srs                               SEQUENCE {
                                              resource            SRS-ResourceId,
                                              uplinkBWP           BWP-Id
                                          }
    },
    pucch-PathlossReferenceRS-Id      PUCCH-PathlossReferenceRS-Id,
    p0-PUCCH-Id                       P0-PUCCH-Id,
    closedLoopIndex                   ENUMERATED { i0, i1 }
}
```

Figure 21

```
SRS-SpatialRelationInfo ::=    SEQUENCE {
    Cell                       CHOICE {
                                   ServCellIndex
                                   PCI or PCI-index
    }
    servingCellId              ServCellIndex                OPTIONAL,    -- Need S
    referenceSignal            CHOICE {
        ssb-Index                  SSB-Index,
        csi-RS-Index               NZP-CSI-RS-ResourceId,
        srs                        SEQUENCE {
            resourceId                 SRS-ResourceId,
            uplinkBWP                  BWP-Id
        }
    }
}
```
Figure 22
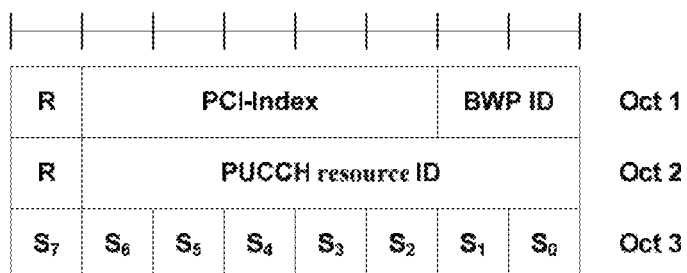
Figure 23
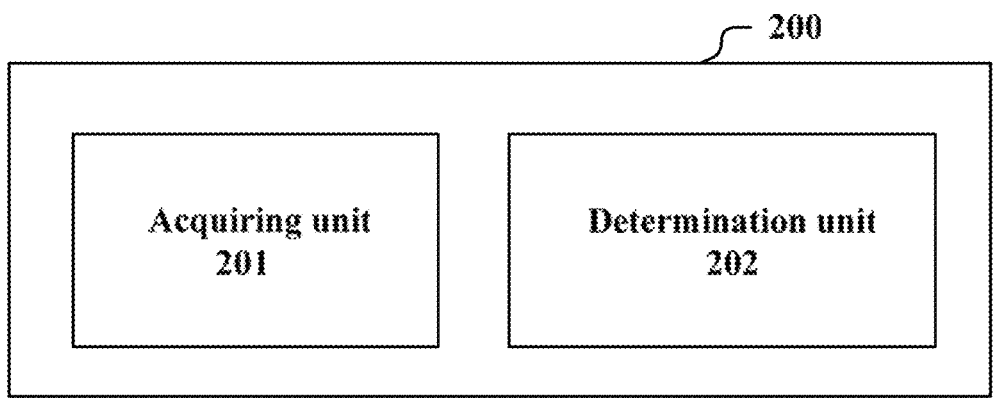
Figure 24 ic DEVICE AND METHOD FOR
WIRELESS COMMUNICATION, AND
COMPUTER-READABLE STORAGE
MEDIUM

CROSS-REFERENCE TO RELATED APPLICATIONS

The present application is based on PCT filing PCT/CN2021/076688, filed Feb. 18, 2021, which claims priority to Chinese Patent Application No. 202010116448.5, titled "ELECTRONIC DEVICE AND METHOD FOR WIRELESS COMMUNICATION, AND COMPUTER-READABLE STORAGE MEDIUM", filed on Feb. 25, 2020 with the China National Intellectual Property Administration (CNIPA), each of which is incorporated herein by reference in its entirety.

FIELD

The present disclosure relates to the technical field of wireless communications, in particular to mobility management of user equipment (UE), and in more particular to an electronic apparatus and a method for wireless communications and a computer-readable storage medium.

BACKGROUND

UE in a connected state may be required to be handed over to another cell due to factors such as mobility. An example of a process of inter-cell handover is shown in FIG. 1. First, a serving cell (a serving gNB shown in the Figure) of the UE configures a mobility reference signal (RS) for the UE via radio resource control (RRC) signaling, which includes a reference signal of a neighboring cell, such as a channel state information reference signal (CSI-RS) or a synchronization signal block (SSB). The UE measures the reference signal to obtain a measurement result such as reference signal receiving power (L3-RSRP), and filters the measurement result by using a layer 3 (L3) filter in order to obtain a stable neighboring cell measurement result.

Next, the UE informs the serving gNB of the measurement result through a reporting process related to radio resource management (RRM). In a case that the serving gNB determines that the UE is required to be handed over to a target cell (a target gNB shown in FIG. 1), the serving gNB first transmits a handover request to the target gNB. The target gNB determines whether to accept the UE through an admission control algorithm. Assuming that the target gNB determines to accept the UE, the target gNB transmits a handover request acknowledgement to the current serving gNB. Then, the serving gNB performs RRC reconfiguration for the UE, and the UE initiates a process of accessing into the target gNB based on the RRC reconfiguration, that is, transmits the RRCReconfigurationComplete.

The above mobility management involves RRC signaling, which itself results in relatively large delay and load overhead. According to the above process, the UE cannot know information of a beam to be used by the target cell before the handover is completed, which may not meet the delay requirements of some services. Therefore, it is desirable to provide a handover process with small delay.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry configured to: transmit to user equipment, via radio resource control signaling, configuration information of a universal Transmission Configuration Indicator state, where the universal Transmission Configuration Indicator state includes a Transmission Configuration Indicator state of a downlink beam of a serving cell of the user equipment and a Transmission Configuration Indicator state of a downlink beam of a non-serving cell other than the serving cell; and determine activation information of a downlink beam of a target cell, where the user equipment is to be handed over to the target cell.

According to another aspect of the present disclosure, a method for wireless communications is provided. The method includes: transmitting to user equipment, via radio resource control signaling, configuration information of a universal Transmission Configuration Indicator state, where the universal Transmission Configuration Indicator state includes a Transmission Configuration Indicator state of a downlink beam of a serving cell of the user equipment and a Transmission Configuration Indicator state of a downlink beam of a non-serving cell other than the serving cell; and determining activation information of a downlink beam of a target cell, where the user equipment is to be handed over to the target cell.

According to an aspect of the present disclosure, an electronic apparatus for wireless communications is provided. The electronic apparatus includes processing circuitry configured to: acquire from a base station, via radio resource control signaling, configuration information of a universal Transmission Configuration Indicator state, wherein the universal Transmission Configuration Indicator state includes a Transmission Configuration Indicator state of a downlink beam of a serving cell of user equipment and a Transmission Configuration Indicator state of a downlink beam of a non-serving cell other than the serving cell; and determine activation information of a downlink beam of a target cell, where the user equipment is to be handed over to the target cell.

According to another aspect of the present disclosure, a method for wireless communications is provided. The method includes: acquiring from a base station, via radio resource control signaling, configuration information of a universal Transmission Configuration Indicator state, where the universal Transmission Configuration Indicator state includes a Transmission Configuration Indicator state of a downlink beam of a serving cell of user equipment and a Transmission Configuration Indicator state of a downlink beam of a non-serving cell other than the serving cell; and determining activation information of a downlink beam of a target cell, where the user equipment is to be handed over to the target cell.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and method according to the embodiments of the present disclosure, by configuring the Transmission Configuration Indicator (TCI) state of the non-serving cell for the UE in advance, the UE is enabled to know the activation information of the downlink beam of the target cell before the handover is completed, so as to prepare a corresponding receiving beam in advance to perform receiving, reducing the delay.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 2 shows pseudo codes for configuring TCI-state information element through RRC parameters;

FIG. 3 is a block diagram showing functional modules of an electronic apparatus for wireless communications according to an embodiment of the present disclosure;

FIG. 4 shows an example of a universal TCI-state information element according to an embodiment of the present disclosure;

FIG. 16 shows an example of a universal uplink TCI-state information element;

FIG. 20 is a schematic diagram showing an example of a process of inter-cell handover according to an embodiment of the present disclosure;

FIG. 21 shows an example of pseudo codes for configuration of universal spatial relation information of PUCCH;

FIG. 22 shows an example of pseudo codes for configuration of general spatial relationship information of SRS;

FIG. 23 shows an example of a particular form of MAC CE signaling;

FIG. 24 is a block diagram showing functional modules of an electronic apparatus for wireless communications according to another embodiment of the present disclosure;

DETAILED DESCRIPTION OF EMBODIMENTS

Figure 1:
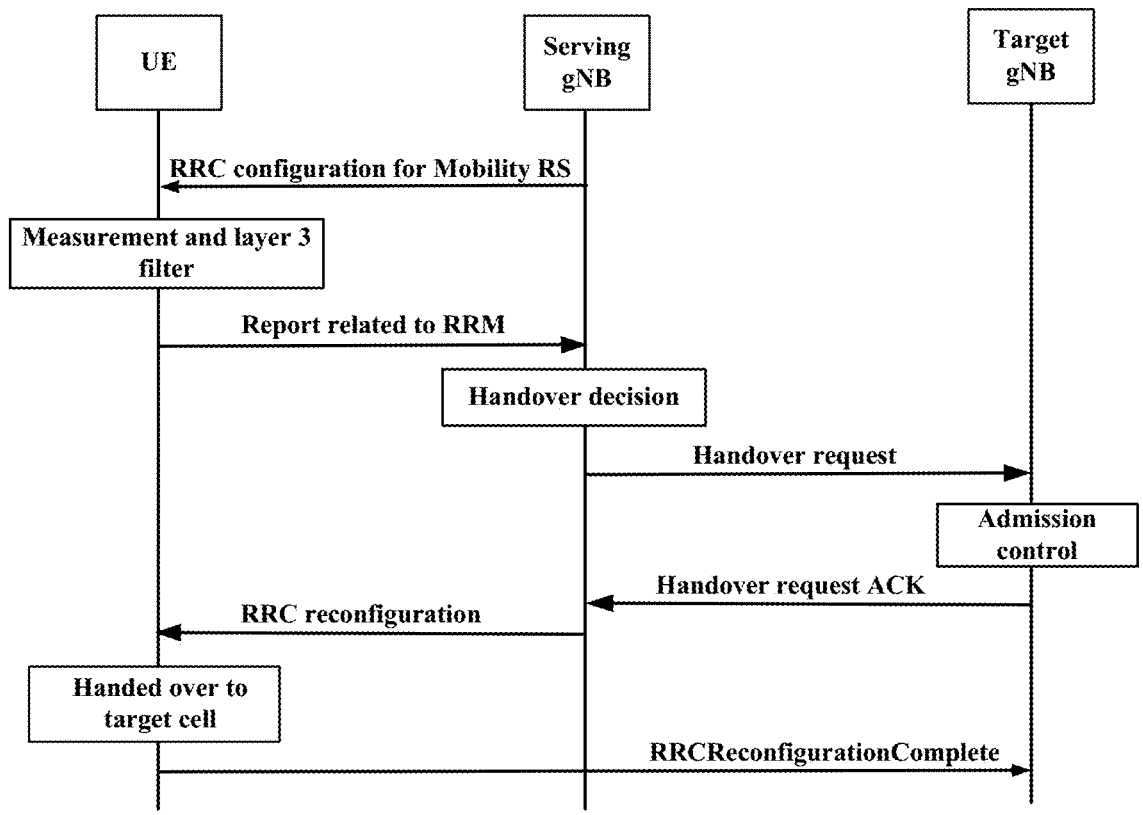
FIG. 1 is a schematic diagram showing a process of inter-cell handover in Rel.15/16.

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and timeconsuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

In the 5G standard of 3GPP, TCI state is proposed to indicate a downlink beam of a serving cell. Each TCI state corresponds to a downlink reference signal (CSI-RS or SSB), that is, corresponds to a direction of a downlink emission beam. The configuration of the TCI state is achieved by configuring TCI-state information element through the RRC parameters, as shown in FIG. 2. In the Figure, tci-StateId represents an ID of a TCI state, ServCellindex represents an identifier of a serving cell of UE, NZP-CSI-RS-ResourceId represents an ID of CSI-RS resources corresponding to the TCI state, and SSB-Index represents an ID of an SSB corresponding to the TCI state.

It can be seen that the cell in the TCI-state information element can only be the serving cell of the UE. Therefore, the TCI state of a non-serving cell (i.e. the direction of the downlink emission beam) cannot be configured through the information element, so that it is impossible to indicate the direction of the downlink emission beam of the target cell to the UE before the handover is completed.

In this embodiment, a universal TCI state is proposed, so that the UE can know the direction of the downlink emission beam of the target cell before the handover is completed. The universal TCI state may also be referred to as a global TCI state, universal TCI, and the like.

FIG. 3 is a block diagram showing functional modules of an electronic apparatus 100 for wireless communications according to an embodiment of the present disclosure. As shown in FIG. 3, the electronic apparatus 100 includes a transmitting unit 101 and a determination unit 102. The transmitting unit 101 is configured to transmit configuration information of a universal TCI state to UE via RRC signaling. The universal TCI state includes a TCI state of a downlink beam of a serving cell of the UE and a TCI state of a downlink beam of a non-serving cell other than the serving cell. The determination unit 102 is configured to determine activation information of a downlink beam of a target cell. The UE is to be handed over to the target cell.

The transmitting unit 101 and the determination unit 102 may be implemented by one or more processing circuitries. The processing circuitry may be implemented as, for example, a chip or a processor. In addition, it should be understood that various functional units in the electronic apparatus shown in FIG. 3 are logical modules divided based on specific functions implemented by these functional units, and are not intended to limit implementations, which is also applicable to examples of other electronic apparatuses to be described subsequently.

The electronic apparatus 100 may be arranged on the base station side or communicatively connected to a base station, for example. The base station described in the present disclosure may also be a transmit receive point (TRP) or an access point (AP). It should be further pointed out that the electronic apparatus 100 may be implemented at a chip level or an apparatus level. For example, the electronic apparatus 100 may function as a base station itself and further include external apparatuses such as a memory and a transceiver (which are not shown in the drawings). The memory may be configured to store programs to be executed and related data information required for the base station to implement various functions. The transceiver may include one or more communication interfaces to support communications with various apparatuses (for example, UE, other base stations or the like). Implementations of the transceiver are not limited herein, which is also applicable to other configuration examples of the electronic apparatus arranged on the base station side to be described subsequently.

The transmitting unit 101 configures the universal TCI state for the UE through RRC signaling. The universal TCI state includes the TCI state of the downlink beam of the current serving cell and the TCI state of the downlink beam of the non-serving cell. FIG. 4 shows an example of a universal TCI state information element. It can be seen that FIG. 4 is different from FIG. 2 in that the cell may be selected and the cell may be a serving cell or a non-serving cell.

The non-serving cell may be indicated by a physical cell identifier (PCI) or a physical cell identifier index (PCI-Index) of the cell. In the example shown in FIG. 4, the non-serving cell is indicated by the PCI-Index of the cell. For example, the non-serving cell is a cell in a list of cells configured for mobility measurement (for example, a neighboring cell whose reference signal is measured as described in the background), and the PCI-Index is an index for the list. For example, a PCI-Index may indicate a serial number of a cell in the list. For example, cells in the list may be arranged according to an ascending or descending order of PCIs of the cells, and a PCI-Index indicates a position of a cell in the list. It should be understood that the ascending or descending arrangement is only an example and the present disclosure is not limited thereto, as long as the list is known and consistent for both the gNB and the UE.

According to the existing standards, in a case that the reference signal is an SSB, the maximum number of cells for measurement is 32. In a case that the reference signal is CSI-RS, the maximum number of cells for measurement is 96. Therefore, the number of bits required for the PCI-Index is no greater than 7, reducing the signaling overhead.

Upon receiving the configuration information of the universal TCI state, the UE may determine the TCI state of the serving cell and the TCI state of the non-serving cell. For example, a maximum of 128 TCI states may be configured for each cell.

Based on the configuration information of the universal TCI state, when the cell handover occurs, the determination unit 102 may determine activation information of the downlink beam of the target cell to which the UE is to be handed over. In other words, the determination unit 102 may determine which downlink beam(s) of the target cell will be activated for transmission with respect to the UE.

In an example, the transmitting unit 101 is further configured to transmit a media access control-control element (MAC CE) including the activation information of the downlink beam to the UE. After acquiring the activation information in the MAC CE, the UE may determine that the target cell will emit on the downlink beam corresponding to the TCI state indicated by the activation information.

The downlink beam includes a downlink control beam and a downlink data beam. The MAC CE may include the activation information of the downlink control beam (case 1), or both the activation information of the downlink control beam and the activation information of the downlink data beam (case 2). The two cases are described below respectively.

Case 1

Figure 5:
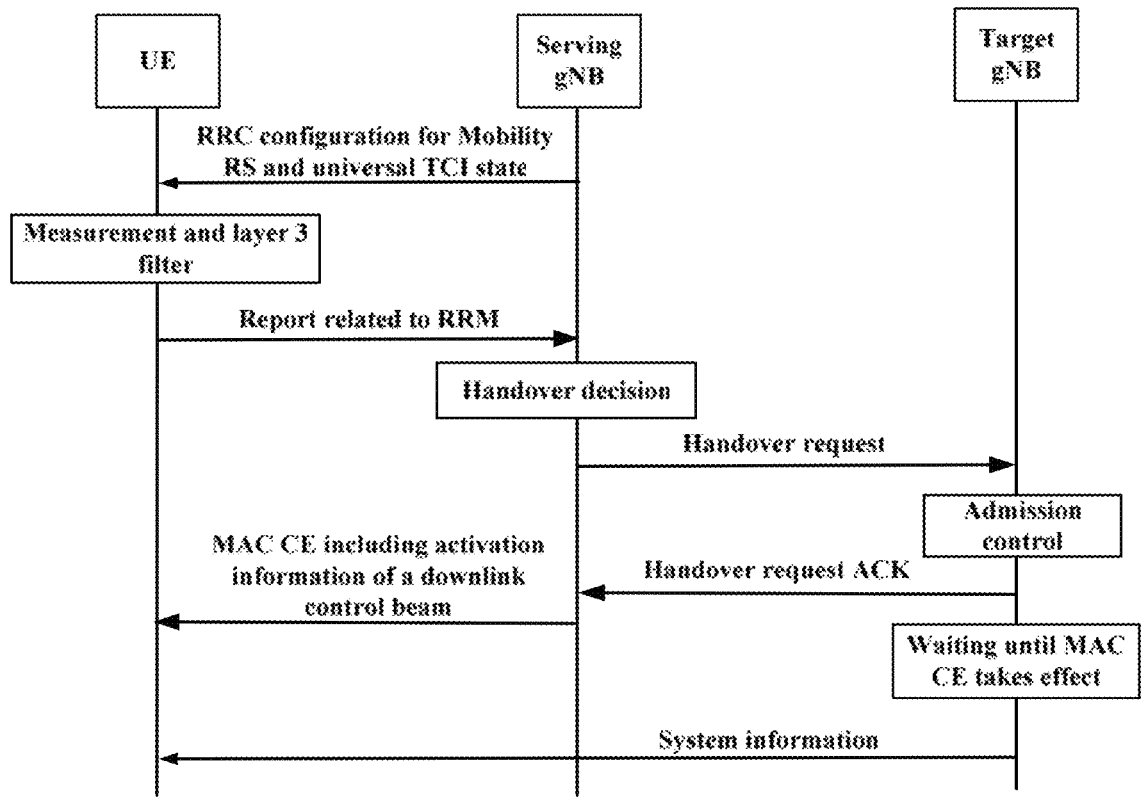
FIG. 5 is a schematic diagram showing an example of a process of inter-cell handover according to an embodiment of the present disclosure.

In this case, for example, the MAC CE may include the activation information of the downlink control beam of the target cell. FIG. 5 is a schematic diagram showing an example of a process of inter-cell handover according to an embodiment of the present disclosure.

The serving gNB determines, according to the measurement result of the reference signal reported by the UE, that the UE is to be handed over to the target cell, and acquires a handover request ACK from the target cell. The serving gNB has provided the UE with the configuration information of the universal TCI state including the TCI state of the target cell via RRC signaling. In order to reduce the delay caused by the inter-cell handover, the serving gNB activates one or more of the TCI states configured for the target cell through MAC CE. The one or more TCI states indicate directions of the one or more activated downlink control beams of the target cell, that is, the directions of the emission beam for transmitting a physical downlink control channel (PDCCH).

In addition, a CORESET (Control Resource SET) may be used to indicate time-frequency resources occupied by the PDCCH to be transmitted. Therefore, the serving gNB may activate one or more TCI states for each CORESET of the target cell. For the initially accessed UE, beam information of CORESET #0 is particularly important, because the UE can detect downlink scheduling information of the target cell in a case of having acquired this beam information, so as to acquire system information of the target cell, such as system information blocks SIB1 and SIB2, as shown in FIG. 5. The information is carried on a physical downlink shared channel (PDSCH) scheduled by the PDCCH.

In the example shown in FIG. 5, the target cell would wait until the MAC CE takes effect. For example, the target cell waits for 3 ms. During this time period, the UE may analyze content of the MAC CE and prepare a new receiving beam. In other words, after 3 ms from the UE transmits HARQ-ACK with respect to the PDSCH carrying the MAC CE to the serving gNB, the serving gNB and the UE consider that the downlink control beam indicated by the activation information of the MAC CE starts to take effect.

In the example, since only the beam direction of the downlink control channel, i.e. the PDCCH, is activated, it can be designed that the UE receives the downlink data channel, i.e. the PDSCH using a same receiving beam, because from the perspective of the network side, the beam for transmitting the CORESET and the beam for transmitting the PDSCH should be roughly in the same direction or even completely consistent to ensure the performance of the UE receiving the PDSCH.

Figure 6:
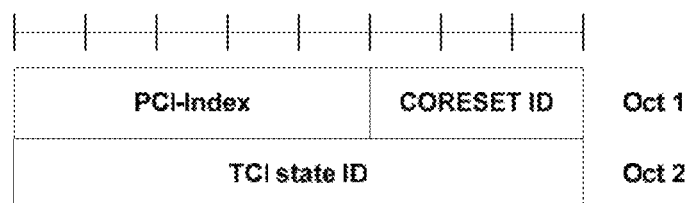
FIG. 6 shows an example of a particular form of MAC CE signaling.
Figure 7:
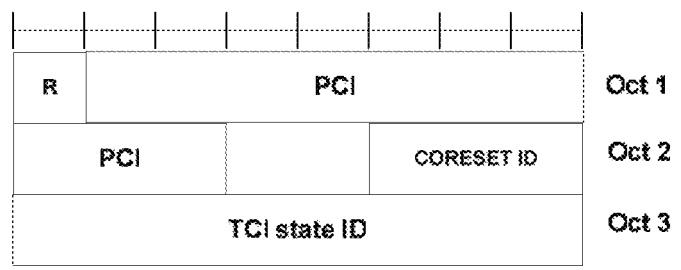
FIG. 7 shows an example of a particular form of MAC CE signaling.

For example, the activation information of the downlink control beam may include: information of the identifier (ID) of the target cell, a CORESET ID, and a TCI-state ID. FIG. 6 and FIG. 7 show examples of particular forms of the corresponding MAC CE signaling. In FIG. 6, the ID of the target cell is represented by the PCI-Index. In FIG. 7, the ID of the target cell is represented by 10 bits of PCI, and R represents a reserved bit. The description of the PCI-Index is as described above and is not repeated herein. The CORESET ID corresponds to a specific CORESET, which indicates a position of the time-frequency resources of the PDCCH.

The number of bits occupied by the TCI state ID depends on the maximum number of TCI states that can be configured. In a case that a maximum of 128 TCI states can be configured, 7 bits are required to uniquely indicate respective TCI states. In the examples shown in FIG. 6 and FIG. 7, considering a possible increase in the number of TCI states in the future, 8 bits are used to indicate the TCI state ID. It should be understood that this is not restrictive and the number of used bits may be appropriately increased or reduced according to actual situations. In addition, a case where only one TCI state is activated is shown in FIG. 6 and FIG. 7, which is not restrictive, and multiple TCI states may be activated as needed.

Case 2

Figure 8:
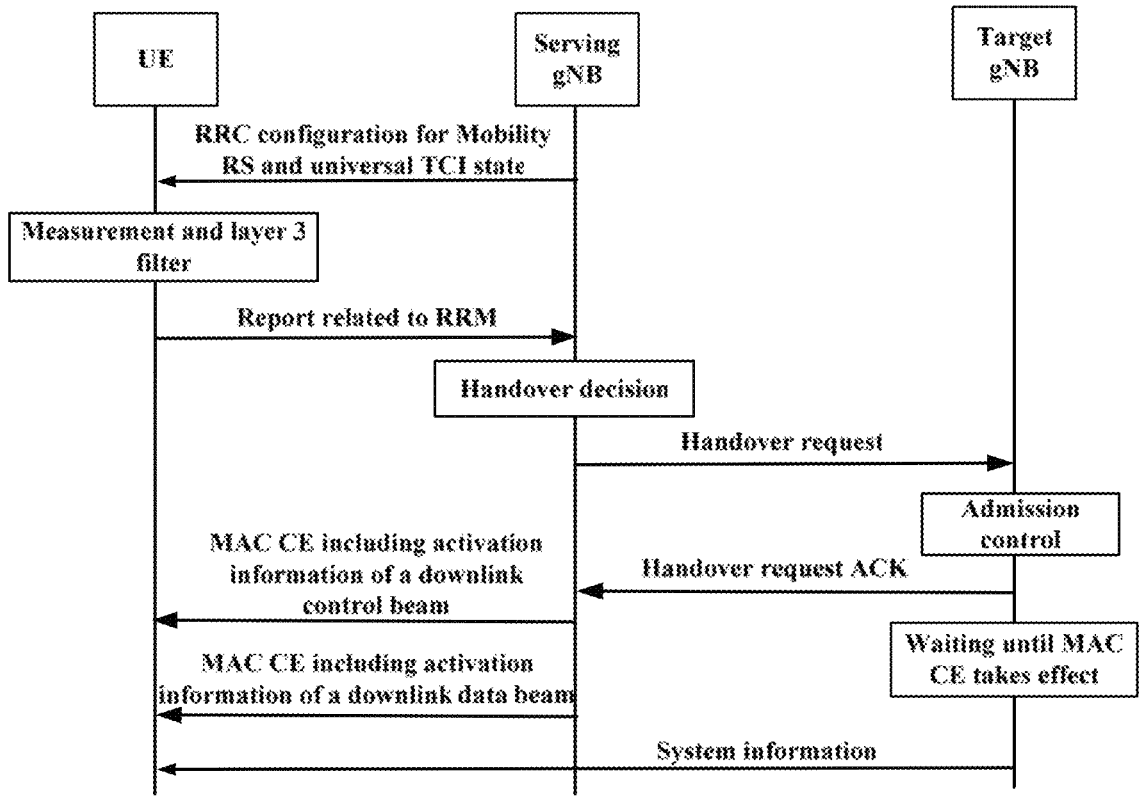
FIG. 8 is a schematic diagram showing another example of a process of inter-cell handover according to an embodiment of the present disclosure.

In this case, in addition to the activation information of the downlink control beam of the target cell, the MAC CE further includes the activation information of the downlink data beam of the target cell. FIG. 8 shows another schematic diagram of an example of a process of inter-cell handover according to an embodiment of the present disclosure.

It can be seen that compared with FIG. 5, signaling of the serving gNB transmitting MAC CE including the activation information of the downlink data beam of the target cell to the UE is further included in FIG. 8. In this way, the beam of the target cell may be activated more flexibly. The description of the same part as that in FIG. 5 is omitted below and only an example of a format of the MAC CE for activating the downlink data beam of the target cell will be described in detail.

For example, up to eight downlink data beams may be activated to facilitate the target cell to indicate the beam of the PDSCH in a more flexible manner. The target cell may indicate the beam of the PDSCH using a TCI field in the downlink control information (DCI). For example, a 3-bit TCI field may be used to indicate one of the eight downlink data beams activated by the MAC CE to transmit the PDSCH. Specifically, for example, the eight activated downlink data beams may be arranged in an ascending or descending order of their corresponding TCI state IDs, and a downlink data beam corresponding to a TCI state with a serial number indicated by the TCI field is a beam for transmitting the PDSCH.

For example, the activation information of the downlink data beam may include information of the ID of the target cell, an ID of a band width part (BWP), and a bitmap of the TCI states. Similarly, the ID of the target cell may be represented by the PCI or the PCI-Index of the target cell. The BWP ID represents the identifier of the BWP used by the target cell. The bitmap of the TCI states indicates the activated TCI state in a form of bitmap.

Figure 9:
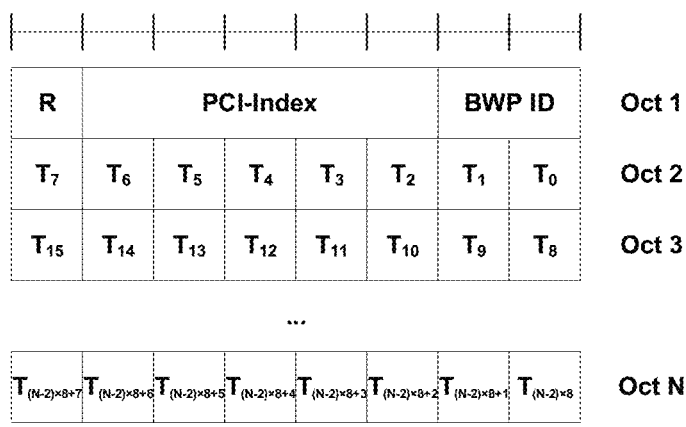
FIG. 9 shows an example of a particular form of MAC CE signaling.

For ease of understanding, FIG. 9 shows an example of a particular form of MAC CE signaling. In the Figure, R represents a reserved bit, and the ID of the target cell is represented by the PCI-Index. Oct2 to OctN represent the bitmap of the TCI states, each bit corresponds to a TCI state. For example, from a lowest bit of Oct2 to a highest bit of OctN, each bit sequentially corresponds to a TCI state in a corresponding position in a case where the TCI states are arranged in an ascending or descending order of TCI state IDs. For example, in a case where a certain bit is equal to 1, a TCI state corresponding to the bit is activated. In a case where up to 8 downlink data beams are activated, the number of bits that are equal to 1 in the bitmap does not exceed 8. In a case where up to 128 TCI states are configured, a bitmap including 16 bytes is required.

In case 1, the data channel uses the same wide beam as the control channel. In case 2, a narrow beam of the data channel may be used according to actual requirements of data transmission. Compared with the wide beam, the narrow beam has a smaller coverage and a higher beamforming gain.

Figure 10:
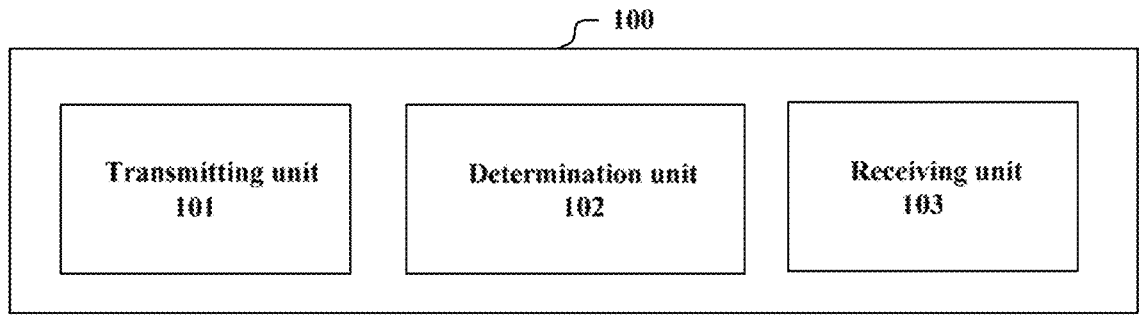
FIG. 10 is a block diagram showing functional modules of an electronic apparatus for wireless communications according to an embodiment of the present disclosure.

In another example, the electronic apparatus 100 further includes a receiving unit 103, as shown in FIG. 10. The receiving unit 103 is configured to receive activation information of a downlink beam of a target cell from UE. Accordingly, the determination unit 102 may determine the activation information.

Figure 11:
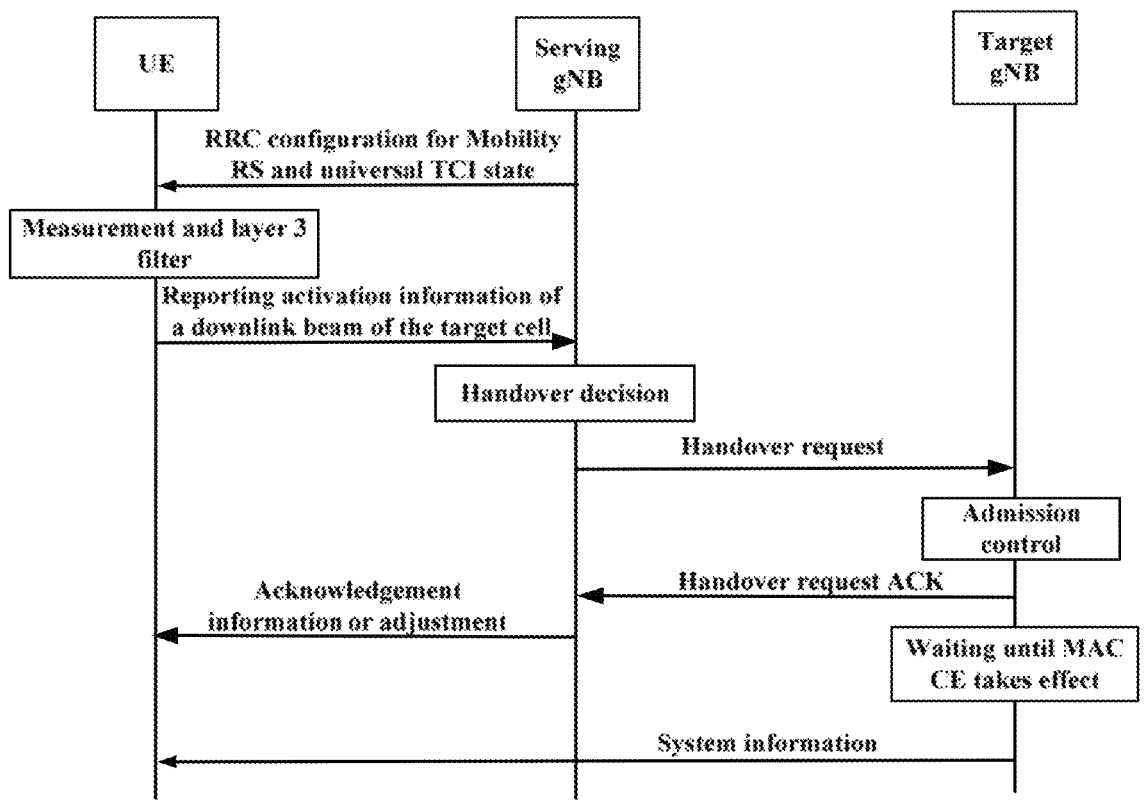
FIG. 11 is a schematic diagram showing another example of a process of inter-cell handover according to an embodiment of the present disclosure.

In the previous example, the activation of the downlink beam of the target cell is controlled by the base station, that is, the network side. In this example, the process of activating the downlink beam of the target cell is initiated by the UE side. FIG. 11 is a schematic diagram showing an information procedure of inter-cell handover according to this example.

For example, the UE triggers the activation process based on the occurrence of a measurement event. Multiple L3 events are defined in the standard, for example, an event A2: the serving cell is worse than a certain threshold; and an event A3: a neighboring cell is better than the serving cell by a certain offset. These events may trigger the cell handover of the UE. When determining the cell handover triggered by the above events, the UE informs the serving cell of which event causing the handover through a report of L3. In addition, the UE further determines the target cell to which the UE is to be handed over and a downlink beam of the target cell that should be activated, and reports the activation information of the downlink beam of the target cell to the serving cell. For example, the UE may report the activation information through uplink MAC CE.

The activation information may include the activation information of the downlink control beam of the target cell. The activation information of the downlink control beam may include information of the ID of the target cell, a CORESET ID and the TCI state ID. For example, the activation information should include at least one TCI state of the CORESET #0.

After receiving the activation information, the serving gNB may perform the handover process with respect to the target cell according to the activation information and transmit acknowledgement information with respect to the activation information to the UE. The acknowledgement information, for example, may be transmitted through DCI. In addition, the serving gNB may further adjust the TCI state indicated in the activation information through determination, and inform the UE of the adjustment via the MAC CE. After receiving the adjustment, the UE performs receiving in accordance with the adjusted TCI state. It should be noted that although the signaling interaction between the gNB and the UE is uniformly shown as the acknowledgement information or adjustment in FIG. 11, different signaling forms may be adopted for these two types of information.

Figure 12:
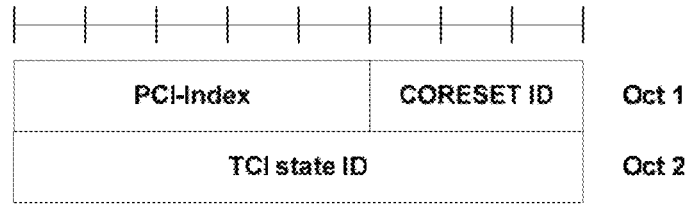
FIG. 12 shows an example of a particular form of MAC CE signaling.
Figure 13:
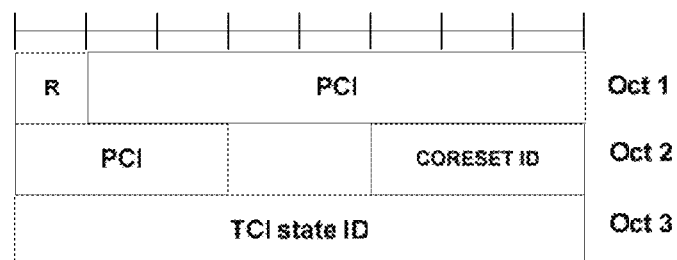
FIG. 13 shows an example of a particular form of MAC CE signaling.

FIG. 12 shows an example of a particular form of the MAC CE signaling. The ID of the target cell is represented by the PCI-Index. The CORESET ID, for example, should be equal to 0. It can be seen that this form is exactly the same as that in FIG. 6, and PCI-Index may be replaced with the PCI (occupying 10 bits) of the target cell to obtain the form shown in FIG. 13.

In addition, the activation information may further include the activation information of the downlink data beam of the target cell, and the corresponding information procedure is still as shown in FIG. 11. For example, the activation information of the downlink control beam and the activation information of the downlink data beam may be transmitted through two pieces of MAC CE. Similarly, the gNB may transmit the acknowledgement information or the adjustment information with respect to the activation information of the downlink data beam, which is not repeated herein.

Figure 14:
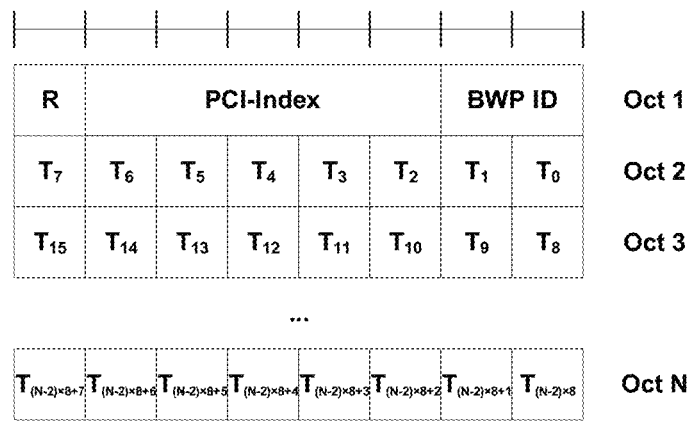
FIG. 14 shows an example of a particular form of MAC CE signaling.

FIG. 14 shows an example of a particular form of MAC CE signaling. In the Figure, R represents a reserved bit, and the ID of the target cell is represented by the PCI-Index. It can be seen that this form is exactly the same as that in FIG. 9, except that the downlink data beam to be activated is determined by the UE.

In addition, in a case where the activation information does not include the activation information of the downlink data beam, the TCI state of the downlink control beam may be used as the TCI state of the downlink data beam.

On the other hand, in this example, the target cell determined by the UE may be a cell not in the list of cells configured for mobility measurement. In some cases, the network side cannot predict a next serving cell and a corresponding beam appropriate for the UE in advance, and in this example it allows the UE to actively report such a cell and an appropriate beam in the cell.

The cell other than cells configured for mobility measurement does not have any related RRC configuration, that is, no corresponding TCI state configuration. Therefore, a concept of QCL assumption may be used, that is, the UE selects an appropriate beam by measuring an SSB of a cell other than the cells configured for mobility measurement. The SSB is not required to be configured in advance, and the UE may automatically blind-detect the SSB in a case of not accessing into the network. When the UE determines to be handed over to such a cell (the target cell), the UE takes an SSB with good signal quality as the QCL assumption of a downlink signal and a channel of the target cell, and informs the serving gNB of the QCL assumption, for example, through MAC CE.

Figure 15:
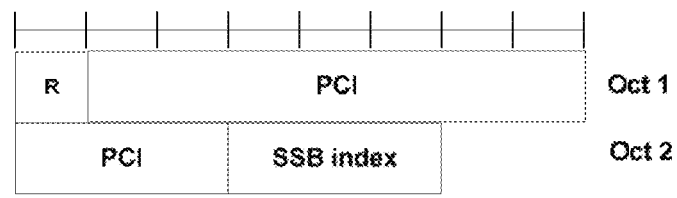
FIG. 15 shows an example of a particular form of MAC CE signaling.

For example, in this case, the activation information in the MAC CE includes the ID of the target cell and the QCL assumption serving as the TCI state ID. The TCI state ID is an index of the SSB determined by the UE. FIG. 15 shows an example of a particular form of the MAC CE signaling. Since the target cell here is not in the list of cells configured for mobility measurement, the ID of the target cell is identified by the PCI of the target cell and occupies 10 bits. The number of bits occupied by the SSB index depends on the SSB configuration of the target cell. For example, the target cell may have 4 SSBs, 8 SSBs or 64 SSBs, which respectively corresponds to an SSB index with a length of 2 bits, an SSB index with a length of 3 bits and an SSB index with a length of 6 bits. The example shown in FIG. 15 only illustrates the SSB index with a length of 3 bits. For a case of other number of bits, the format of the MAC CE signaling should be modified accordingly. Here, UE can know the number of SSBs of a cell in advance through a synchronization process of SSB and select the most favorable SSB.

The QCL assumption in this case may be used for beam activation of the downlink control channel of the target cell, and may also be used for both the beam activation of the downlink control channel and the beam activation of the downlink data channel. The information procedure of the inter-cell handover may also be with reference to FIG. 11 and is not repeated herein.

In summary, the electronic apparatus 100 according to this embodiment enables the UE, by configuring and activating using the universal TCI state, to obtain the activation information of the downlink beam of the target cell to activate a corresponding receiving beam before the cell handover is completed, reducing the delay caused by the cell handover.

In addition, in a case that the uplink beam and the downlink beam possess symmetry, the UE may perform uplink transmission using the receiving beam for receiving the activated downlink beam, so as to activate the uplink beam. For example, the UE may emit a physical uplink control channel (PUCCH) using the beam for receiving the PDCCH/PDSCH. More generally, all of the sounding reference signal (SRS), the PUCCH, the physical random access channel (PRACH) and the physical uplink shared channel (PUSCH) may be emitted using the beam for receiving the PDCCH/PDSCH, that is, automatically following a beam direction of the CORESET of the downlink PDCCH.

Second Embodiment

In this embodiment, the beam direction of the uplink beam of the target cell is configured additionally. Referring back to FIG. 3, the transmitting unit 101 is further configured to transmit configuration information of a universal uplink TCI state to the UE via RRC signaling. The universal uplink TCI state includes an uplink TCI state of the uplink beam of the serving cell of the UE and an uplink TCI state of the uplink beam of the non-serving cell other than the serving cell.

Here, the universal uplink TCI state is provided, which is similar to the universal TCI state. The universal uplink TCI state may indicate an emission direction of the uplink beam of the serving cell and an emission direction of the uplink beam of the non-serving cell. FIG. 16 shows an example of a universal uplink TCI state information element. Compared with the universal downlink TCI state information element shown in FIG. 4, the TCI state ID is replaced with the uplink TCI state ID, and the reference signals further includes an uplink reference signal SRS in addition to the downlink reference signal CSI-RS and the SSB.

Similarly, in the universal uplink TCI state, a cell may be selected. The cell may be a serving cell or a non-serving cell. The non-serving cell may be indicated by the PCI or PCI-Index of the cell. In the example shown in FIG. 16, the non-serving cell is indicated by the PCI-Index of the cell. The serving gNB configures multiple uplink TCI states of multiple non-serving cells for the UE via RRC signaling, that is, multiple uplink emission beam directions. A maximum number of uplink TCI states configured for each cell is, for example, 128.

Based on the configuration information of the universal uplink TCI state, when cell handover occurs, the determination unit 102 may determine the activation information of the uplink beam of the target cell to which the UE is to be handed over. In other words, the determination unit 102 may determine which uplink beam(s) should be activated for uplink transmission with respect to the target cell.

Similar to the first embodiment, the activation information for the uplink beam may be determined and transmitted by the network side, that is, the base station. Alternatively, the activation information of the uplink beam may be determined and reported by the UE side, and acknowledged or adjusted by the base station. The two architectures are described below respectively.

I. The Activation Information is Determined and Transmitted by the Network Side

In an example, the transmitting unit 101 is further configured to transmit MAC CE including the activation information of the uplink beam to the UE. After acquiring the activation information in the MAC CE, the UE may determine to emit on the uplink beam corresponding to the uplink TCI state indicated by the activation information.

The uplink beam includes an uplink control beam and an uplink data beam. The MAC CE may include the activation information of the uplink control beam (case 1), or both the activation information of the uplink control beam and the activation information of the uplink data beam (case 2). These two cases are described below respectively.

Case 1

Figure 17:
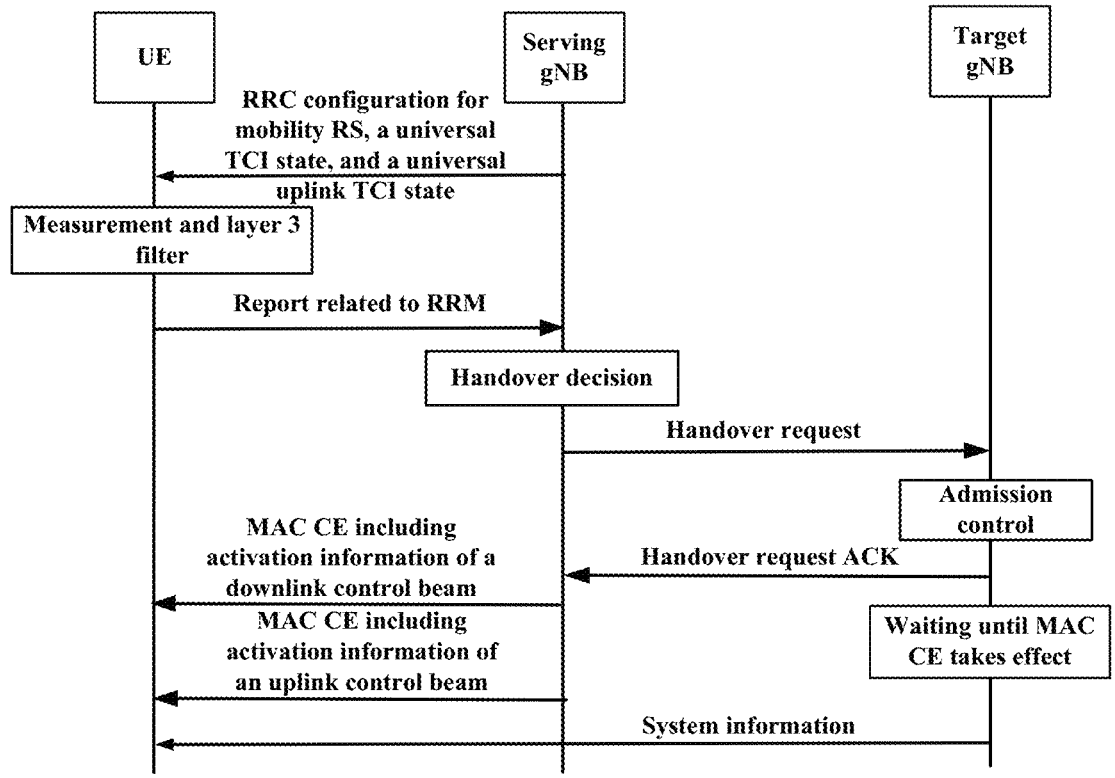
FIG. 17 is a schematic diagram showing an example of a process of inter-cell handover according to an embodiment of the present disclosure.

In this case, for example, the MAC CE may include the activation information of the uplink control beam of the target cell. FIG. 17 is a schematic diagram showing an example of a process of inter-cell handover according to an embodiment of the present application.

It can be seen that FIG. 17 is similar to FIG. 5, except that the serving gNB adds configuration of the universal uplink TCI state in the RRC configuration, and adds the MAC CE including the activation information of the uplink control beam on the basis of the MAC CE in FIG. 5. The uplink control beam is a beam, for example, used for transmitting SRS, PUCCH, PRACH, and the like.

In this example, since only the beam direction of the uplink control channel is activated, it can be designed that the UE uses the same emission beam to transmit an uplink data channel, that is, the PUSCH.

Figure 18:
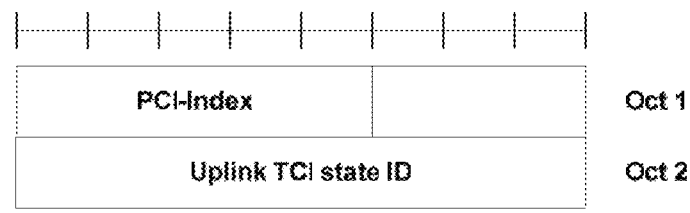
FIG. 18 shows an example of a particular form of MAC CE signaling.

For example, the activation information of the uplink control beam may include information of the ID of the target cell and the uplink TCI state ID. FIG. 18 shows an example of a particular form of the MAC CE signaling. The ID of the target cell is identified by the PCI-Index of the target cell, and an uplink TCI state ID occupies 1 byte.

It should be understood that FIG. 18 only shows an example, which is not restrictive. For example, multiple uplink TCI state IDs may be included. In addition, both the activation information of the downlink control beam and the activation information of the uplink control beam may be included in one piece of MAC CE signaling. In this case, only one ID field of the target cell may be included to reduce signaling overhead.

Case 2

Figure 19:
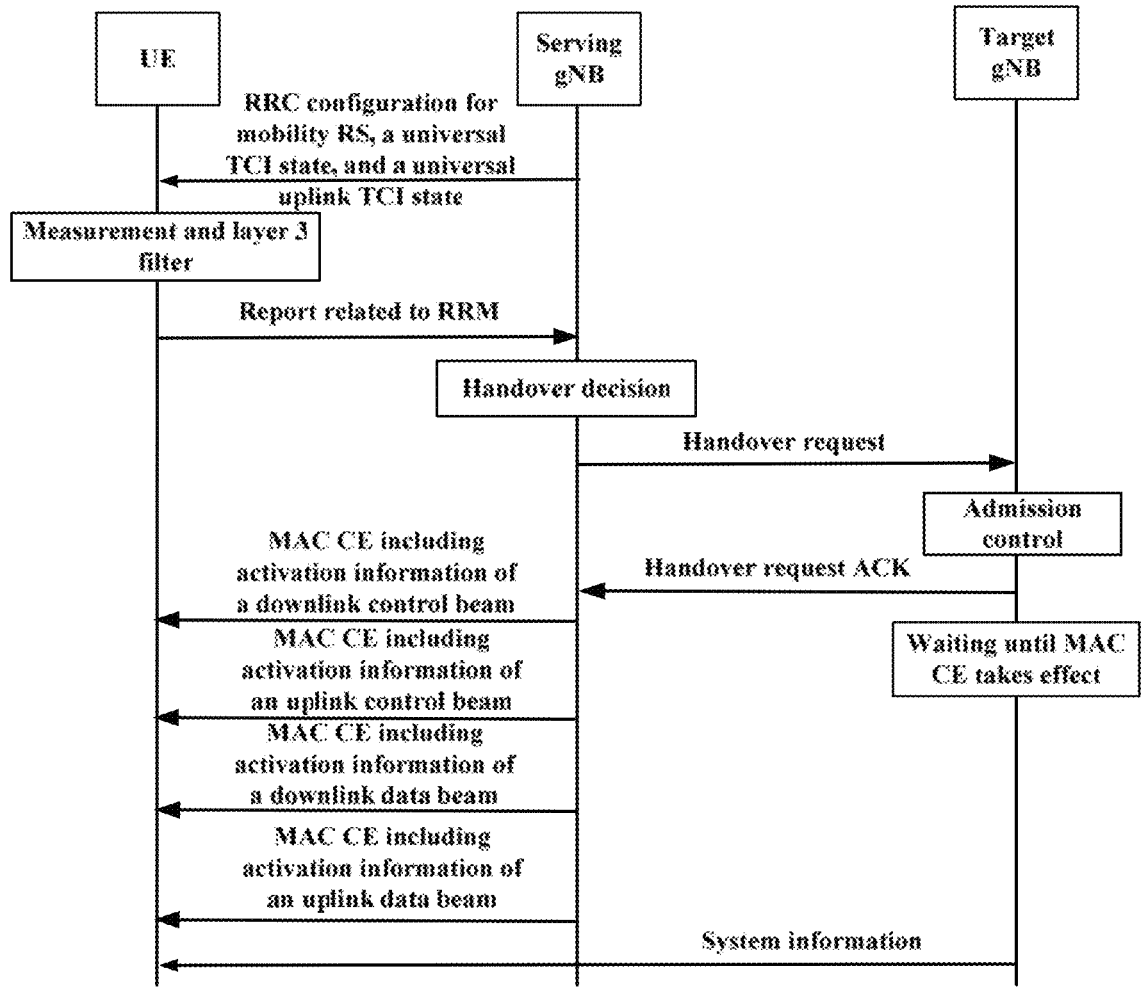
FIG. 19 is a schematic diagram showing an example of a process of inter-cell handover according to an embodiment of the present disclosure.

In this case, in addition to the activation information of the uplink control beam of the target cell, the MAC CE further includes the activation information of the uplink data beam of the target cell. The uplink data beam, for example, is used for transmitting the PUSCH. FIG. 19 is a schematic diagram showing another example of a process of inter-cell handover according to an embodiment of the present disclosure.

It can be seen that compared with FIG. 17, in FIG. 19, the serving gNB further transmits MAC CE signaling including the activation information of the uplink data beam of the target cell to the UE. In this way, the uplink beam of the target cell may be activated more flexibly.

For example, the activation information of the uplink data beam may include the information of the ID of the target cell and the uplink TCI state ID. An example of a particular form of the MAC CE signaling is similar to FIG. 18 and is not repeated herein.

II. The Activation Information is Determined and Reported by the UE Side

In this case, the receiving unit 103 is further configured to receive activation information of the uplink beam of the target cell from the UE. Accordingly, the determination unit 102 may determine the activation information. FIG. 20 is a schematic diagram showing an information procedure of the inter-cell handover according to the example.

FIG. 20 is similar to FIG. 11, except that uplink MAC CE for UE reporting the activation information of the uplink beam is added. The activation information may include the information of the ID of the target cell and the ID of the uplink TCI state corresponding to the uplink beam. It can be understood that the uplink MAC CE and the MAC CE for reporting the activation information of the downlink beam may be merged. A particular form of the uplink MAC CE may be with reference to FIG. 18 and is not repeated herein.

The uplink beam described herein may be the uplink control beam or the uplink data beam.

After receiving the activation information, the serving gNB may perform the handover process with respect to the target cell according to the activation information, and transmit acknowledgement information with respect to the activation information to the UE. The acknowledgement information, for example, may be transmitted through DCI. In addition, the serving gNB may also adjust the uplink TCI state indicated in the activation information through determination, and inform the UE of the adjustment via the MAC CE. After receiving the adjustment, the UE performs transmitting in accordance with the adjusted uplink TCI state. It should be noted that although the signaling interaction between the gNB and the UE is uniformly shown as the acknowledgement information or adjustment in FIG. 20, different signaling forms may be adopted for these two types of information.

In addition, in a case that the activation information does not include the activation information of the uplink data beam, the uplink TCI state of the uplink control beam may be used as the uplink TCI state of the uplink data beam.

In summary, the electronic apparatus 100 according to this embodiment enables the UE, by configuring and activating using the universal TCI state, to obtain the activation information of the uplink beam of the target cell to activate a corresponding emission beam before the cell handover is completed, further reducing the delay caused by the cell handover.

Third Embodiment

In the existing standards, the uplink beam indication is based on an RRC parameter: spatial relation information (SpatialRelationInfo). For the SRS, the spatial relation information is SRS-SpatialRelationInfo. For the PUCCH, the spatial relation information is PUCCH-SpatialRelationInfo. In this embodiment, the parameter is extended to a universal parameter for both the serving cell and the non-serving cell, so that the parameter may be used to activate the uplink beam of the target cell.

Specifically, the transmitting unit 101 is configured to transmit configuration information of the universal spatial relation information to the UE via RRC signaling. The universal spatial relation information includes spatial relation information of the uplink beam of the serving cell of the UE and spatial relation information of the uplink beam of the non-serving cell.

FIG. 21 and FIG. 22 respectively show an example of pseudo codes for configuration of the universal spatial relation information with respect to PUCCH and an example of pseudo codes for configuration of the universal spatial relation information with respect to SRS. In FIG. 21, by modifying the original servingCellId to be a selectable cell, the universal spatial relation information is enabled to indicate the spatial relation information of the serving cell or the spatial relation information of the non-serving cell. The ID of the non-serving cell may be represented by the PCI or the PCI-Index of the cell (represented by the PCI-Index in the example shown in FIG. 21). In FIG. 22, a cell option is similarly added.

Based on the universal spatial relation information, the determination unit 102 may determine the activation information of the uplink beam of the target cell to which the UE is to be handed over. The uplink beam herein may be SRS or PUCCH.

For example, the transmitting unit 101 may be further configured to transmit MAC CE including the activation information of the uplink beam to the UE. The MAC CE may include the information of the ID of the target cell and the ID of the spatial relation information. FIG. 23 shows an example of a particular form of MAC CE with respect to PUCCH. The ID of the target cell is represented by the PCI-Index, and bits $S_7$-$S_0$ represent the ID of the spatial relation information. The related information procedure may be with reference to FIG. 17, except that the content of RRC configuration and the content of the activation information of MAC CE are different. Specifically, the serving gNB configures the mobility RS, the universal TCI state and the universal spatial relation information through RRC signaling, and transmits the MAC CE including the activation information according to this embodiment to the UE.

In addition, similar to the second embodiment, the activation information of the uplink beam may be determined and reported via uplink MAC CE by the UE. A particular form of the MAC CE signaling is still as shown in FIG. 23. For example, the information procedure of inter-cell handover may be with reference to FIG. 20, except that the content of the RRC configuration and the content of the activation information of the MAC CE are different. Specifically, the serving gNB configures the mobility RS, the universal TCI state and the universal spatial relation information via RRC signaling, and the UE reports the MAC CE including the activation information according to this embodiment to the serving gNB.

Relevant technical details are described in detail in the first embodiment and the second embodiment and are not repeated herein.

In summary, the electronic apparatus 100 according to this embodiment enables the UE, by configuring and activating using the universal spatial relation information, to obtain the activation information of the uplink beam of the target cell to activate a corresponding emission beam before the cell handover is completed, further reducing the delay caused by the cell handover.

Fourth Embodiment

FIG. 24 is a block diagram showing functional modules of an electronic apparatus 200 according to another embodiment of the present disclosure. As shown in FIG. 24, the electronic apparatus 200 includes: an acquiring unit 201 and a determination unit 202. The acquiring unit 201 is configured to acquire configuration information of a universal TCI state from a base station via RRC signaling. The universal TCI state includes a TCI state of a downlink beam of a serving cell of UE and a TCI state of a downlink beam of a non-serving cell other than the serving cell. The determination unit 202 is configured to determine the activation information of the downlink beam of the target cell. The UE is to be handed over to the target cell.

The acquiring unit 201 and the determination unit 202 may be implemented by one or more processing circuitries. The processing circuitry may be implemented as, for example, a chip and a processor. In addition, it should be understood that various functional units in the electronic apparatus shown in FIG. 24 are logical modules divided based on functions implemented by these functional units, and are not intended to limit implementations.

The electronic apparatus 200 may, for example, be set at a UE side or be communicatively connected to the UE. Here, it should also be pointed out that the electronic apparatus 200 may be implemented at a chip level or an apparatus level. For example, the electronic apparatus 200 may function as UE itself, and may also include external apparatuses such as a memory and a transceiver (not shown in the drawings). The memory may be configured to store programs to be executed and related data information required for the user equipment to implement various functions. The transceiver may include one or more communication interfaces to support communications with various apparatuses (for example, other user equipment or the like). Implementations of the transceiver are not limited herein.

The definition and function of the universal TCI state in this embodiment are the same as those in the first embodiment, and are not described in detail herein. As mentioned above, the activation information of the downlink beam may be determined and transmitted by the network side, that is, the base station. Alternatively, the activation information of the downlink beam may be determined and reported by the UE side, and acknowledged or adjusted by the base station. The two architectures are described below respectively.

I. The Activation Information is Determined and Transmitted by the Network Side

In this case, the acquiring unit 201 is further configured to acquire MAC CE including the activation information of the downlink beam from the base station.

In an example, the MAC CE includes the activation information of the downlink control beam (PDCCH) of the target cell. For example, the activation information of the downlink control beam includes information of the ID of the target cell, a CORESET ID, and a TCI state ID. A particular form of MAC CE signaling, for example, may be with reference to FIG. 6 and FIG. 7. By parsing the MAC CE, the UE knows the target cell to which the UE will be handed over to, the downlink beam to be used by the target cell for emission, and a position of the time-frequency resource of the PDCCH. Therefore, the UE prepares a corresponding receiving beam to receive the PDCCH of the target cell and obtain scheduling information for the PDSCH, so as to obtain system information of the target cell carried on the PDSCH. The information procedure of inter-cell handover may be with reference to FIG. 5 and is not repeated herein.

In another example, the MAC CE further includes activation information of a downlink data beam (PDSCH) of the target cell. For example, the activation information of the downlink data beam includes information of the ID of the target cell, a BWP ID, and a bitmap of the TCI states. A particular form of the MAC CE signaling, for example, may be with reference to FIG. 9. By parsing the MAC CE, the UE knows which downlink data beam(s) of the target cell is activated. For example, a maximum number of the activated downlink data beams is 8. The target cell may indicate one of the activated downlink data beams to transmit PDSCH through a TCI field in the DCI. The relevant information procedure may be with reference to FIG. 8 and is not repeated herein.

II. The Activation Information is Determined and Reported by the UE Side

In this case, the UE determines the target cell to which the UE is to be handed over and the downlink beam(s) of the target cell that should be activated according to a measurement result.

Figure 25:
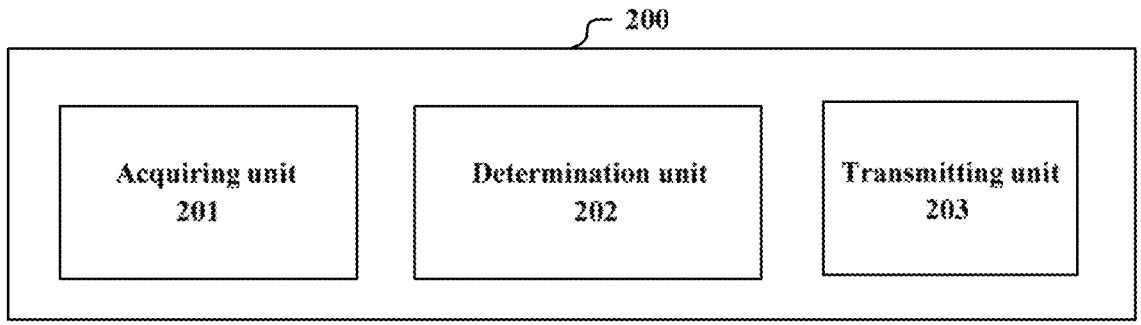
FIG. 25 is a block diagram showing functional modules of an electronic apparatus for wireless communications according to another embodiment of the present disclosure.

As shown in FIG. 25, the electronic apparatus 200 further includes a transmitting unit 203 configured to transmit the activation information to the base station. The transmitting unit 203 may transmit the activation information through the uplink MAC CE.

For example, the activation information may include the activation information of the downlink control beam (PDCCH) of the target cell determined by the UE. The activation information of the downlink control beam, for example, includes information of the ID of the target cell and the TCI state ID. A particular form of the MAC CE signaling, for example, is with reference to FIG. 12 or FIG. 13.

In addition, the activation information may further include the activation information of the downlink data beam (PDSCH) of the target cell. The activation information of the downlink data beam includes, for example, the information of the ID of the target cell, a BWP ID, and a bitmap of the TCI states. A particular form of the MAC CE signaling, for example, may be with reference to FIG. 14. By parsing the MAC CE, the gNB knows the to-be-activated downlink data beam(s) of the target cell determined by the UE. For example, a maximum number of the to-be-activated downlink data beams is 8. The target cell may indicate one of the activated downlink data beams to transmit PDSCH through a TCI field in the DCI.

In addition, the acquiring unit 201 is further configured to receive acknowledgement information for the activation information from the base station via DCI, or receive adjustment for the activation information from the base station through MAC CE. The relevant information procedure may be with reference to FIG. 11 and is not repeated herein.

In this architecture, the target cell determined by the UE may also be a cell not in a list of cells configured for mobility measurement. In this case, the TCI state indicated by the TCI state ID in the activation information is QCL assumption determined by the UE based on the measurement of the SSB of the target cell. For example, the activation information (or the corresponding uplink MAC CE) includes the ID of the target cell and an SSB index. The ID of the target cell is PCI. A particular form of the MAC CE signaling, for example, is with reference to FIG. 15, and is not repeated herein.

In a case that the uplink beam and the downlink beam possess symmetry, the determination unit 202 is further configured to perform uplink transmission using a receiving beam for receiving the activated downlink beam of the target cell. That is, all the SRS, the PUCCH, the PUSCH and the PRACH may automatically follow the beam direction of the CORESET of the PDCCH.

In summary, through configuration and activation with the universal TCI state, the electronic apparatus 200 according to this embodiment may obtain the activation information of the downlink beam of the target cell to activate a corresponding receiving beam before the cell handover is completed, reducing the delay caused by the cell handover.

In addition, in addition to the configuration and activation of the downlink beam of the target cell, the electronic apparatus 200 may further realize configuration and activation of the uplink beam of the target cell. Some details are described in detail in the second embodiment and the third embodiment and are not repeated in the following description. However, the details are still applicable to this embodiment.

In an example, the acquiring unit 201 is further configured to acquire configuration information of a universal uplink TCI state from the base station via RRC signaling. The universal uplink TCI state includes an uplink TCI state of an uplink beam of the serving cell of the UE and an uplink TCI state of an uplink beam of the non-serving cell. The definition and function of the universal uplink TCI state, for example, are with reference to FIG. 16. The indexed reference signal includes one of CSI-RS, SSB and SRS.

Similarly, the uplink TCI state of the uplink beam of the target cell may be activated via MAC CE. Similar to the case of the downlink beam, the activation information of the uplink beam may be determined and transmitted by the network side, that is, the base station. Alternatively, the activation information of the uplink beam may be determined and reported by the UE side, and acknowledged or adjusted by the base station.

In the architecture of determining and transmitting the activation information by the network side, the acquiring unit 201 is further configured to acquire MAC CE including the activation information of the uplink beam from the base station. After acquiring the activation information in the MAC CE, the UE may determine to emit on the uplink beam corresponding to the uplink TCI state indicated by the activation information. The MAC CE may include the activation information of the uplink control beam of the target cell. For example, the uplink control beam is used for transmitting beams of SRS, PUCCH, PRACH, and the like. An example of a process of inter-cell handover may be with reference to FIG. 17 and is not repeated herein. In a case that only the beam direction of the uplink control channel is activated, it may be designed that the UE uses the same emission beam to transmit the uplink data channel, i.e. the PUSCH.

The activation information of the uplink control beam may include: the information of the ID of the target cell, and the uplink TCI state ID. An example of a particular form of the MAC CE signaling may be with reference to FIG. 18.

In addition, in addition to the activation information of the uplink control beam of the target cell, the MAC CE may further include the activation information of the uplink data beam of the target cell. The uplink data beam, for example, is a beam used for transmitting PUSCH. A schematic diagram showing an example of a process of inter-cell handover may be with reference to FIG. 19.

For example, the activation information of the uplink data beam may include information of the ID of the target cell and the uplink TCI state ID.

In the architecture in which the UE side determines and reports the activation information, the determination unit 202 determines the activation information of the uplink beam of the target cell, and the transmitting unit 203 is configured to transmit the activation information to the base station. A schematic diagram of information procedure of inter-cell handover is as shown in FIG. 20.

The transmitting unit 203 may transmit the above activation information via the uplink MAC CE. The activation information may include the information of the ID of the target cell and the ID of the uplink TCI state corresponding to the uplink beam. The uplink beam described herein may be the uplink control beam or the uplink data beam.

After receiving the activation information, the serving gNB may perform a handover process with respect to the target cell according to the activation information, and transmit acknowledgement information for the activation information to the UE. For example, the acknowledgement information may be transmitted via DCI. In addition, the serving gNB may adjust the uplink TCI state indicated in the activation information through determination, and inform the UE of the adjustment via MAC CE. After receiving the adjustment, the UE performs transmitting in accordance with the adjusted uplink TCI state. Therefore, the acquiring unit 201 is further configured to receive the acknowledgement information or the adjustment for the activation information from the base station.

In addition, in a case that the activation information does not include the activation information of the uplink data beam, the uplink TCI state of the uplink control beam may be used as the uplink TCI state of the uplink data beam.

In another example, universal spatial relation information is adopted to configure and activate the uplink beam of the target cell. As mentioned above, the universal spatial relation information includes spatial relation information of the uplink beam of the serving cell of the UE and spatial relation information of the uplink beam of the non-serving cell.

The acquiring unit 201 is configured to acquire the configuration information of the universal spatial relation information from the base station via RRC signaling. The definition and function of universal spatial relation information may be with reference to FIG. 21 and FIG. 22.

In the architecture in which the network side determines and transmits the activation information, the acquiring unit 201 is further configured to acquire MAC CE including the activation information of the uplink beam from the base station. The determination unit 202 may determine the activation information of the uplink beam of the target cell after parsing the MAC CE signaling. The uplink beam herein may be SRS or PUCCH.

The MAC CE may include the information of the ID of the target cell and the ID of the spatial relation information. FIG. 23 shows an example of a particular form of the MAC CE with respect to PUCCH. The ID of the target cell is represented by the PCI-Index, and bits $S_7$-$S_0$ represent the ID of the spatial relation information. The related information procedure may be with reference to FIG. 17, except that the content of RRC configuration and the content of the activation information of MAC CE are different. Specifically, the serving gNB configures the mobility RS, the universal TCI state and the universal spatial relation information via RRC signaling, and transmits the MAC CE including the activation information in this architecture to the UE.

In the architecture in which the UE side determines and reports the activation information, the determination unit 202 determines the activation information of the uplink beam of the target cell, and the transmitting unit 203 is configured to transmit the activation information to the base station. For example, the transmitting unit 203 may transmit the activation information via uplink MAC CE, and a particular form of MAC CE signaling is still as shown in FIG. 23. For example, an information procedure of inter-cell handover may be with reference to FIG. 20, except that the content of RRC configuration and the content of the activation information of MAC CE are different. Specifically, the serving gNB configures the mobility RS, the universal TCI state and the universal spatial relation information via RRC signaling, and the UE reports the MAC CE including the activation information in this architecture to the serving gNB.

In summary, through configuration and activation with the universal uplink TCI state or universal spatial relation information, the electronic apparatus 200 according to this embodiment may obtain the activation information of the uplink beam of the target cell to activate a corresponding emission beam before the cell handover is completed, further reducing the delay caused by the cell handover.

Fifth Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 26:
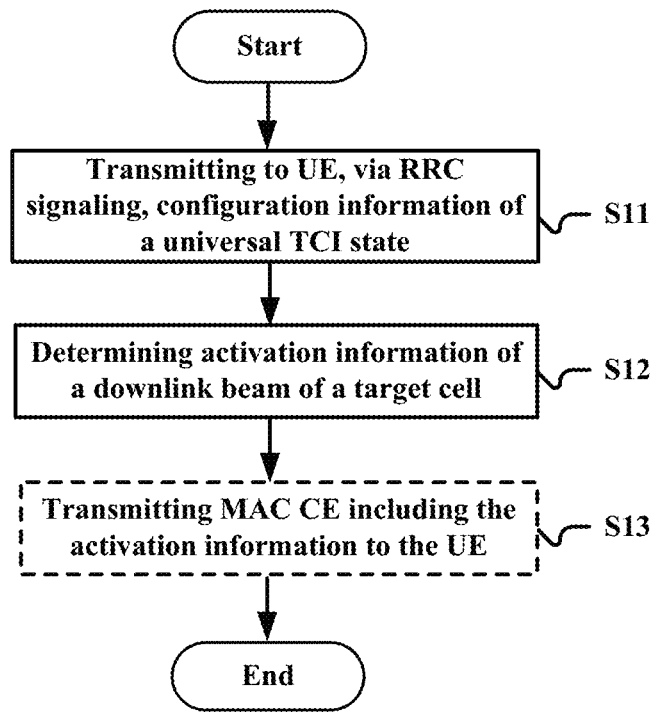
FIG. 26 shows a flowchart of a method for wireless communications according to an embodiment of the present disclosure.

FIG. 26 shows a flowchart of a method for wireless communications according to an embodiment of the present disclosure. The method includes: transmitting to UE, via RRC signaling, configuration information of a universal TCI state (S11), where the universal TCI state includes a TCI state of a downlink beam of a serving cell of the UE and a TCI state of a downlink beam of a non-serving cell other than the serving cell; and determining activation information of a downlink beam of a target cell, where the UE is to be handed over to the target cell (S12). The method, for example, may be performed at a base station side.

In the universal TCI state, the non-serving cell is indicated by the PCI or PCI-Index of the cell. The non-serving cell is a cell in a list of cells configured for mobility measurement, and the PCI index is an index for the list.

As shown in the dashed line block in FIG. 26, the method may further include a step S13: transmitting MAC CE including the activation information of the downlink beam to the UE. For example, the MAC CE may include the activation information of the downlink control beam of the target cell, and the activation information of the downlink control beam may include information of the ID of the target cell, a CORESET ID, and a TCI state ID. The ID of the target cell may be the PCI or PCI-Index of the target cell.

The MAC CE may further include the activation information of the downlink data beam of the target cell. For example, a maximum number of activated downlink data beams is 8. The target cell may use a TCI field in the DCI to indicate the beam of PDSCH. The activation information of the downlink data beam may include: the information of the ID of the target cell, the BWP ID, and the bitmap of the TCI states.

In addition, although not shown in the Figure, the above method may further include the following steps instead of S13: receiving the activation information from the UE. The activation information may include the activation information of the downlink control beam of the target cell determined by the UE, and the activation information of the downlink control beam may include the information of the ID of the target cell and the TCI state identifier. Similarly, the activation information may further include the activation information of the downlink data beam of the target cell.

In this case, the above method may further include: transmitting acknowledgement information for the activation information to the UE through DCI. Alternatively, the method includes: transmitting adjustment of the activation information to UE through MAC CE.

If the target cell determined by the UE is a cell other than cells in the list of cells configured for mobility measurement, the TCI state indicated by the TCI state ID may be the QCL assumption determined by the UE based on the measurement of the SSB of the target cell.

In addition, in step S11, the configuration information of the universal uplink TCI state may also be transmitted to the UE via RRC signaling. The universal uplink TCI state includes the uplink TCI state of the uplink beam of the serving cell of the UE and the uplink TCI state of the uplink beam of the non-serving cell other than the serving cell. In step S12, the activation information of the uplink beam of the target cell is determined. The UE is to be handed over to the target cell. In the universal uplink TCI state, the indexed reference signal includes one of CSI-RS, SSB and SRS.

In step S13, MAC CE including the activation information of the uplink beam is further transmitted to the UE. The activation information of the uplink beam may include: the information of the ID of the target cell and the uplink TCI state identifier.

Instead of the universal uplink TCI state, in step S11, configuration information of universal spatial relation information may further be transmitted to the UE via RRC signaling.

The universal spatial relation information includes spatial relation information of the uplink beam of the serving cell of the UE and spatial relation information of the uplink beam of the non-serving cell. In this case, the MAC CE transmitted in step S13 may include, for example, the information of the ID of the target cell and the ID of the spatial relation information of the uplink beam.

Figure 27:
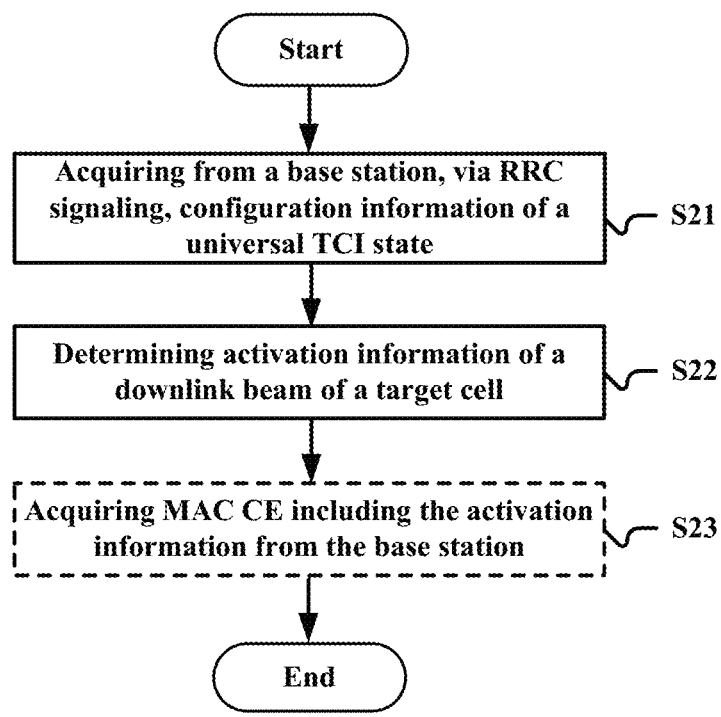
FIG. 27 shows a flowchart of a method for wireless communications according to an embodiment of the present disclosure.

FIG. 27 shows a flowchart of a method for wireless communications according to another embodiment of the present disclosure. The method includes: acquiring from a base station, via RRC signaling, configuration information of a universal TCI state (S21), where the universal TCI state includes a TCI state of a downlink beam of a serving cell of UE and a TCI state of a downlink beam of a non-serving cell other than the serving cell; and determining activation information of a downlink beam of a target cell, where the UE is to be handed over to the target cell (S22). The method, for example, may be performed at a UE side.

In addition, as shown in the dashed line block in FIG. 27, the method may further include a step S23: acquiring MAC CE including the activation information of the downlink beam from the base station. For example, the MAC CE includes the activation information of the downlink control beam of the target cell, and the activation information of the downlink control beam may include information of the ID of the target cell, a CORESET ID, and a TCI state ID.

The MAC CE may further include the activation information of the downlink data beam of the target cell. A maximum number of activated downlink data beams may be 8. The target cell may use a TCI field in the DCI to indicate the beam of PDSCH. The activation information of the downlink data beam, for example, may include: the information of the ID of the target cell, the BWP ID, and the bitmap of the TCI states.

Instead of step S23, the method may include: transmitting activation information to the base station. For example, the activation information includes the activation information of the downlink control beam of the target cell determined by the UE, and the activation information of the downlink control beam includes the information of the ID of the target cell and the TCI state ID. In this case, the method further includes: receiving acknowledgement information for the activation information from the base station through the DCI, or receiving adjustment of the activation information from the base station through MAC CE.

There is a case in which the target cell determined by the UE is other than cells in the list of cells configured for mobility measurement. In this case, the TCI state indicated by the TCI state ID is QCL assumption determined by the UE based on the measurement of the SSB of the target cell.

In a case where the uplink beam and the downlink beam possess symmetry, the UE may perform uplink transmission using the receiving beam for receiving the activated downlink beam of the target cell.

In addition, in step S21, the configuration information of the universal uplink TCI state may also be acquired from the base station via RRC signaling. The universal uplink TCI state includes the uplink TCI state of the uplink beam of the serving cell of the UE and the uplink TCI state of the uplink beam of the non-serving cell other than the serving cell. In the universal uplink TCI state, the indexed reference signal includes one of CSI-RS, SSB and SRS.

It should be noted that the above methods may be utilized in combination or separately. The details are described in detail in the first to fourth embodiments, and are not repeated herein.

The technology according to the present disclosure is applicable to various products.

For example, the electronic apparatus 100 may be implemented as various base stations. The base station may be implemented as any type of evolved node B (eNB) or gNB (a 5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote radio head ends (RRH) located at positions different from the main body. In addition, various types of user equipment may each serve as a base station by performing functions of the base station temporarily or semi-permanently.

The electronic apparatus 200 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

[Application Example Regarding a Base Station]

First Application Example

Figure 28:
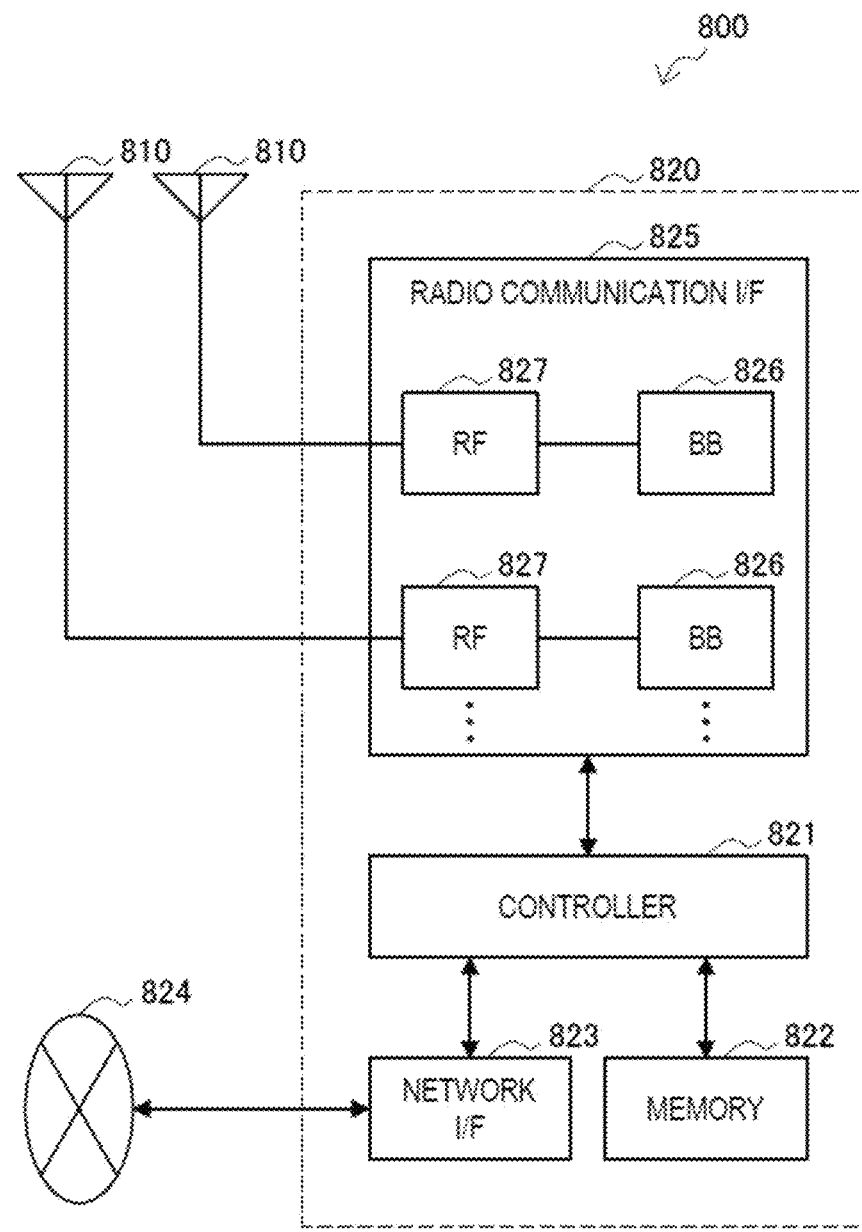
FIG. 28 is a block diagram showing a first example of an exemplary configuration of an eNB or gNB to which the technology of the present disclosure may be applied.

FIG. 28 is a block diagram showing a first example of an exemplary configuration of an eNB or gNB to which technology according to the present disclosure may be applied.

It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a RF cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 28, the eNB 800 may include the multiple antennas 810. For example, the multiple antennas 810 may be compatible with multiple frequency bands used by the eNB 800. Although FIG. 28 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 28, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 28. For example, the multiple RF circuits 827 may be compatible with multiple antenna elements. Although FIG. 28 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 28, the transmitting unit 101, the receiving unit 103 and a transceiver of the electronic apparatus 100 may be implemented by the radio communication interface 825. At least a part of functions may also be implemented by the controller 821. For example, the controller 821 may cause the UE to know the configuration and activation information of the downlink beam (and the uplink beam) of the target cell before the cell handover is completed by performing the functions of the transmitting unit 101, the determination unit 102 and the receiving unit 103.

Second Application Example

Figure 29:
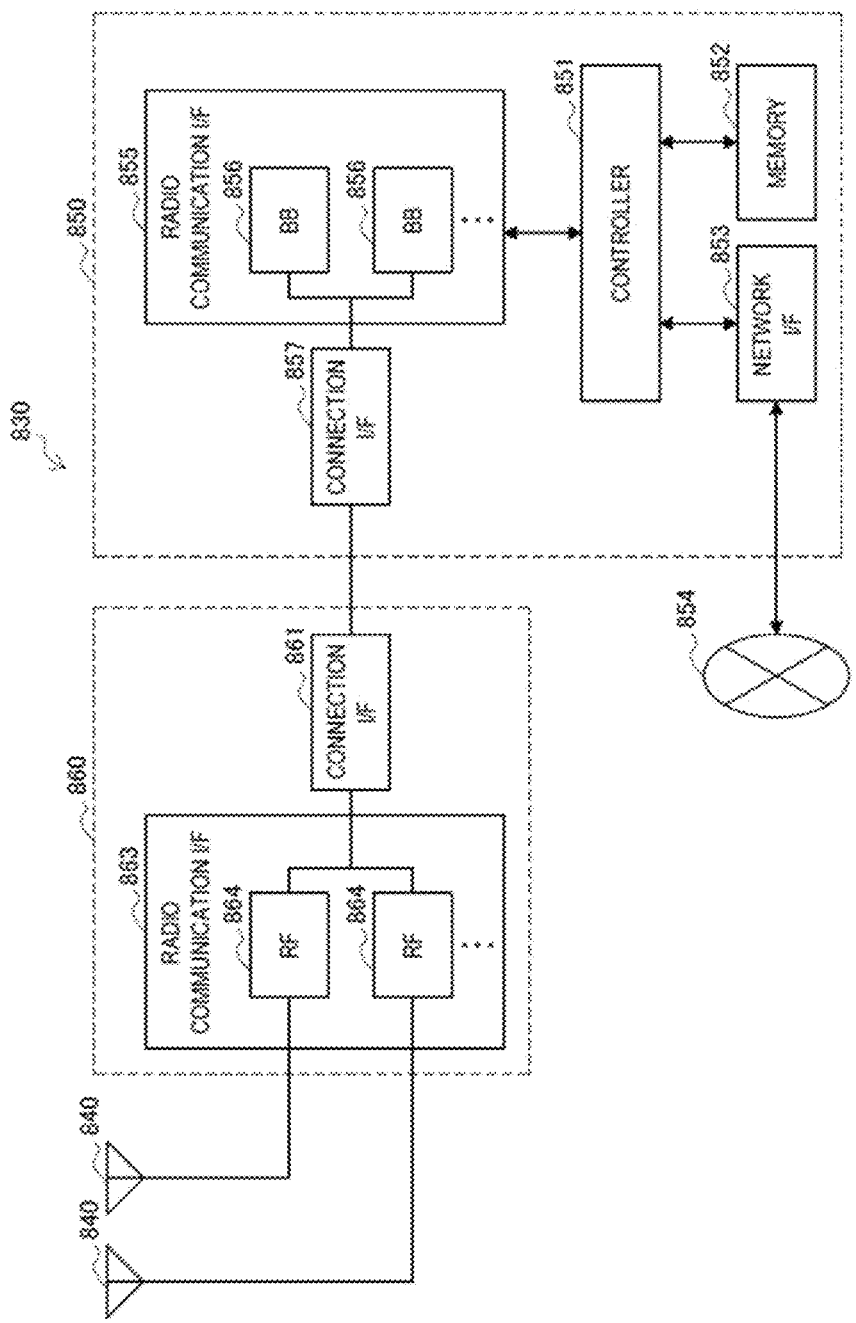
FIG. 29 is a block diagram showing a second example of an exemplary configuration of an eNB or gNB to which the technology of the present disclosure may be applied.

FIG. 29 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 29, the eNB 830 may include the multiple antennas 840. For example, the multiple antennas 840 may be compatible with multiple frequency bands used by the eNB 830. Although FIG. 29 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 28.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 28, except that the BB processor 856 is connected to an RF circuit 864 of the RRH 860 via the connection interface 857. As show in FIG. 29, the radio communication interface 855 may include the multiple BB processors 856. For example, the multiple BB processors 856 may be compatible with multiple frequency bands used by the eNB 830. Although FIG. 29 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 29. For example, the multiple RF circuits 864 may support multiple antenna elements. Although FIG. 29 shows the example in which the radio communication interface 863 includes the multiple RF circuits 864, the radio communication interface 863 may also include a single RF circuit 864.

In the eNB 830 shown in FIG. 29, the transmitting unit 101, the receiving unit 103 and a transceiver of the electronic apparatus 100 may be implemented by the radio communication interface 855 and/or the radio communication interface 863. At least a part of functions may also be implemented by the controller 851. For example, the controller 821 may cause the UE to know the configuration and activation information of the downlink beam (and the uplink beam) of the target cell before the cell handover is completed by performing the functions of the transmitting unit 101, the determination unit 102 and the receiving unit 103.

Application Example Regarding User Equipment

First Application Example

Figure 30:
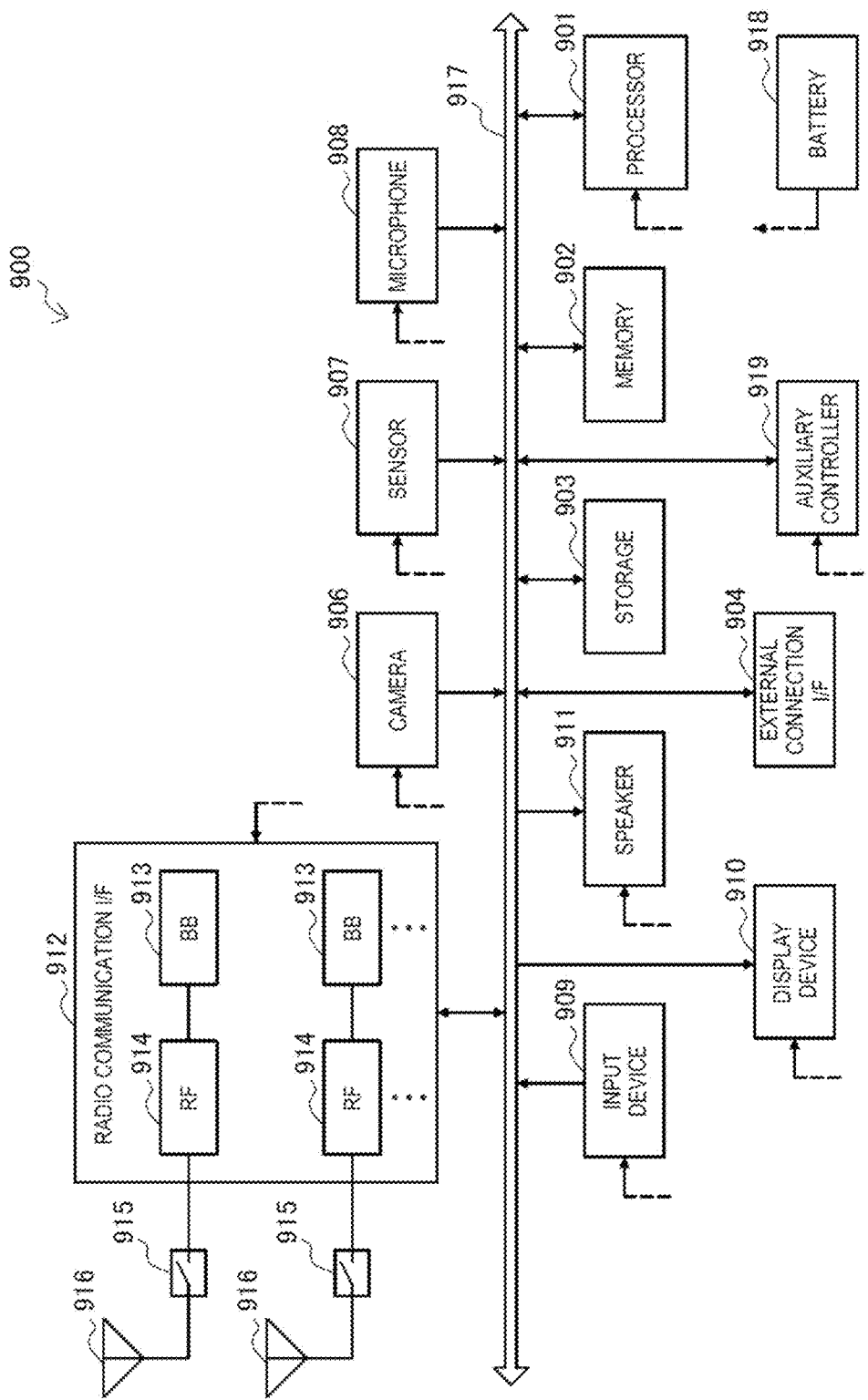
FIG. 30 is a block diagram showing an example of an exemplary configuration of a smartphone to which the technology according to the present disclosure may be applied.

FIG. 30 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 30 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 30. Although FIG. 30 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 30. Although FIG. 30 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 30 via feeder lines that are partially shown as dashed lines in FIG. 30. The auxiliary controller 919, for example, operates a minimum necessary function of the smart phone 900 in a sleep mode.

In the smart phone 900 shown in FIG. 30, the acquiring unit 201, the transmitting unit 203 and a transceiver of the electronic apparatus 200 may be implemented by the radio communication interface 912. At least a part of functions may also be implemented by the processor 901 or the auxiliary controller 919. For example, the processor 901 or the auxiliary controller 919 may cause the UE to know the configuration and activation information of the downlink beam (and the uplink beam) of the target cell before the cell handover is completed by performing the functions of the acquiring unit 201, the determination unit 202 and the transmitting unit 203.

Second Application Example

Figure 31:
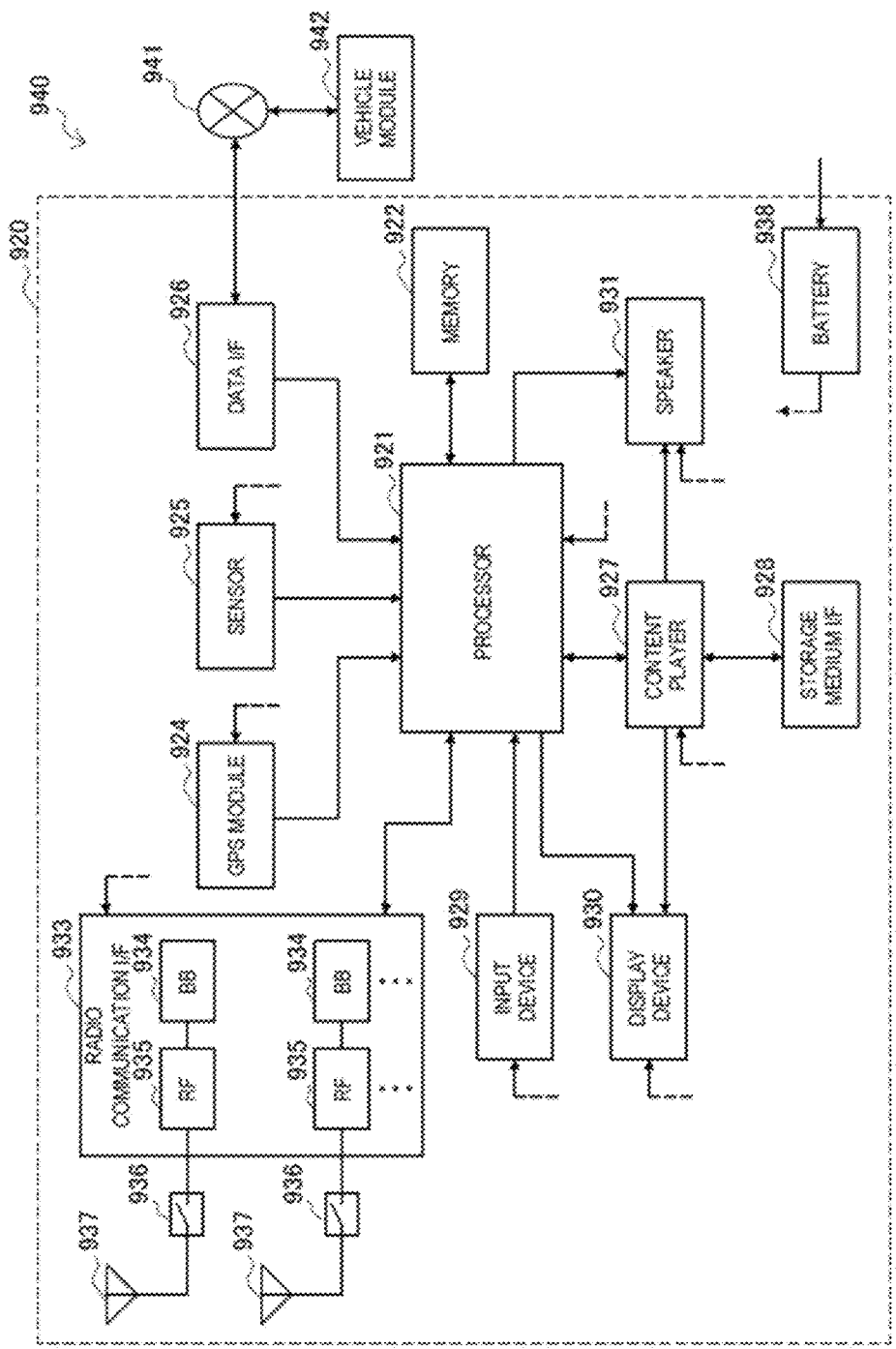
FIG. 31 is a block diagram showing an example of an exemplary configuration of a car navigation apparatus to which the technology according to the present disclosure may be applied.

FIG. 31 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 31. Although FIG. 31 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 31, the car navigation apparatus 920 may include the multiple antennas 937. Although FIG. 31 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 31 via feeder lines that are partially shown as dash lines in FIG. 31. The battery 938 accumulates power supplied from the vehicle.

In the car navigation apparatus 920 shown in FIG. 31, the acquiring unit 201, the transmitting unit 203 and a transceiver of the electronic apparatus 200 may be implemented by the radio communication interface 933. At least a part of functions may also be implemented by the processor 921. For example, the processor 921 may cause the UE to know the configuration and activation information of the downlink beam (and the uplink beam) of the target cell before the cell handover is completed by performing the functions of the acquiring unit 201, the determination unit 202 and the transmitting unit 203.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 3200 shown in FIG. 32) from a storage medium or network, wherein the computer is capable of implementing various functions when installed with various programs.

Figure 32:
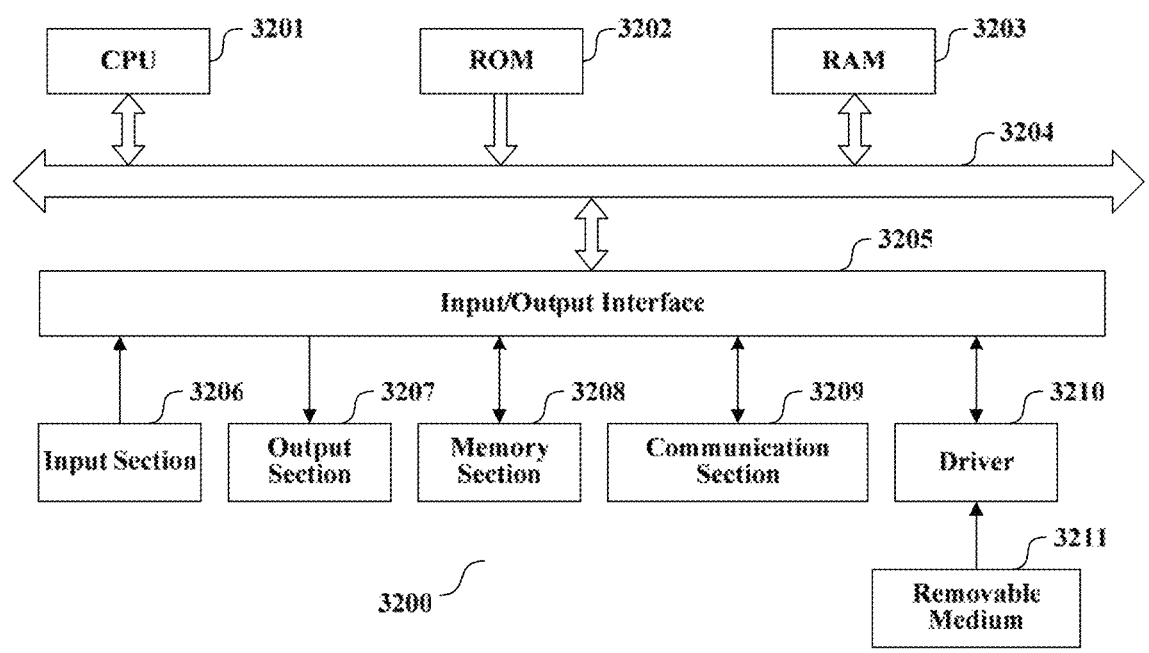
FIG. 32 is a block diagram of an exemplary block diagram illustrating the structure of a general purpose personal computer capable of realizing the method and/or device and/or system according to the embodiments of the present disclosure.

In FIG. 32, a central processing unit (CPU) 3201 executes various processing according to a program stored in a read-only memory (ROM) 3202 or a program loaded to a random access memory (RAM) 3203 from a memory section 3208. The data needed for the various processing of the CPU 3201 may be stored in the RAM 3203 as needed. The CPU 3201, the ROM 3202 and the RAM 3203 are linked with each other via a bus 3204. An input/output interface 3205 is also linked to the bus 3204.

The following components are linked to the input/output interface 3205: an input section 3206 (including keyboard, mouse and the like), an output section 3207 (including displays such as a cathode ray tube (CRT), a liquid crystal display (LCD), a loudspeaker and the like), a memory section 3208 (including hard disc and the like), and a communication section 3209 (including a network interface card such as a LAN card, modem and the like). The communication section 3209 performs communication processing via a network such as the Internet. A driver 3210 may also be linked to the input/output interface 3205, if needed. If needed, a removable medium 3211, for example, a magnetic disc, an optical disc, a magnetic optical disc, a semiconductor memory and the like, may be installed in the driver 3210, so that the computer program read therefrom is installed in the memory section 3208 as appropriate.

In the case where the foregoing series of processing is achieved through software, programs forming the software are installed from a network such as the Internet or a memory medium such as the removable medium 3211.

It should be appreciated by those skilled in the art that the memory medium is not limited to the removable medium

3211 shown in FIG. 32, which has program stored therein and is distributed separately from the apparatus so as to provide the programs to users. The removable medium 3211 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 3202 and the memory section 3208 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   transmit, to a user equipment, via radio resource control (RRC) signaling, configuration information of a universal Transmission Configuration Indicator (TCI) state,
   wherein the universal downlink TCI state comprises a single downlink TCI state information element configured to selectably identify a downlink TCI state from a set of a downlink TCI states consisting of:
      a downlink TCI state of a downlink beam of a serving cell of the user equipment, and
      a downlink TCI state of a downlink beam of a non-serving cell for downlink other than the serving cell, the non-serving cell for downlink being a target cell for a handover of a downlink of the user equipment; and
   determine activation information of a downlink beam of the target cell,
   wherein the activation information of the downlink beam of the target cell:
   is determined by the electronic apparatus, and the processing circuitry is further configured to transmit a media access control-control element (MAC-CE) comprising the activation information of the downlink beam to the user equipment, wherein the transmitted activation information comprises activation information of a downlink control beam or a downlink data beam of the target cell determined by the electronic apparatus, and the transmitted activation information of the downlink control beam comprises an identifier of the target cell determined by the electronic apparatus and a corresponding TCI state identifier, or
   is determined by the user equipment, and the processing circuitry is further configured to receive the activation information from the user equipment, wherein the received activation information comprises activation information of a downlink control beam or a downlink data beam of the target cell determined by the user equipment, and the received activation information of the downlink control beam comprises an identifier of the target cell determined by the user equipment and a corresponding TCI state identifier.

2. The electronic apparatus according to claim 1,
   wherein the non-serving cell is indicated in the universal TCI state by a non-serving cell physical cell identifier or a non-serving cell physical cell identifier index,
   wherein the non-serving cell is a cell in a list of cells configured for mobility measurement, and the non-serving cell physical cell identifier index is an index that identifies the non-serving cell in the list of cells.

3. The electronic apparatus according to claim 1,
   wherein the processing circuitry is further configured to transmit acknowledgement information for the activation information received from the user equipment to the user equipment through downlink control information, or transmit an adjustment of the activation information received from the user equipment to the user equipment through a second MAC-CE.

4. A method for wireless communications, comprising:
   transmitting, to a user equipment, via radio resource control (RRC) signaling, configuration information of a universal Transmission Configuration Indicator (TCI) state,
   wherein the universal downlink TCI state comprises a single downlink TCI state information element configured to selectably identify a downlink TCI state from a set of a downlink TCI states consisting of:
      a downlink TCI state of a downlink beam of a serving cell of the user equipment, and
      a downlink TCI state of a downlink beam of anon-serving cell for downlink other than the serving cell, the non-serving cell for downlink being a target cell for a handover of a downlink of the user equipment; and
   determining activation information of a downlink beam of the target cell,
   wherein the activation information of the downlink beam of the target cell:
   is determined by the electronic apparatus, and the method further comprises transmitting a media access control-control element (MAC-CE) comprising the activation information of the downlink beam to the user equipment, wherein the transmitted activation information comprises activation information of a downlink control beam or a downlink data beam of the target cell determined by the electronic apparatus, and the transmitted activation information of the downlink control beam comprises an identifier of the target cell determined by the electronic apparatus and a corresponding TCI state identifier, or is determined by the user equipment, and the method further comprises receiving the activation information from the user equipment, wherein the received activation information comprises activation information of a downlink control beam or a downlink data beam of the target cell determined by the user equipment, and the received activation information of the downlink control beam comprises an identifier of the target cell determined by the user equipment and a corresponding TCI state identifier.

\* \* \* \* \*